US009925463B2

(12) United States Patent
Hattori

(10) Patent No.: US 9,925,463 B2
(45) Date of Patent: Mar. 27, 2018

(54) GAMING SYSTEM, GAME SERVER AND GAMING MACHINE

(75) Inventor: Takanori Hattori, Yokosuka (JP)

(73) Assignee: UNIVERSAL ENTERTAINMENT CORPORATION, Tokyo (JP)

(*) Notice: Subject to any disclaimer, the term of this patent is extended or adjusted under 35 U.S.C. 154(b) by 1190 days.

(21) Appl. No.: 11/199,988

(22) Filed: Aug. 10, 2005

(65) Prior Publication Data

US 2006/0111186 A1   May 25, 2006

(30) Foreign Application Priority Data

Aug. 13, 2004   (JP) ................................. 2004-236139

(51) Int. Cl.
| | | |
|---|---|---|
| A63F 9/24 | (2006.01) | |
| A63F 13/493 | (2014.01) | |
| A63F 13/332 | (2014.01) | |
| A63F 13/323 | (2014.01) | |
| A63F 13/35 | (2014.01) | |
| A63F 13/30 | (2014.01) | |

(52) U.S. Cl.
CPC ............ *A63F 13/493* (2014.09); *A63F 13/12* (2013.01); *A63F 13/323* (2014.09); *A63F 13/332* (2014.09); *A63F 13/35* (2014.09); *A63F 2300/206* (2013.01); *A63F 2300/406* (2013.01); *A63F 2300/407* (2013.01); *A63F 2300/554* (2013.01); *A63F 2300/636* (2013.01)

(58) Field of Classification Search
USPC .......................................................... 463/42
See application file for complete search history.

(56) References Cited

U.S. PATENT DOCUMENTS

| | | | | |
|---|---|---|---|---|
| 6,554,707 | B1* | 4/2003 | Sinclair et al. ................. | 463/39 |
| 6,840,861 | B2* | 1/2005 | Jordan et al. ................... | 463/42 |
| 2002/0022522 | A1* | 2/2002 | Yamada .......................... | 463/42 |
| 2002/0154214 | A1* | 10/2002 | Scallie et al. ................... | 348/51 |
| 2003/0055984 | A1* | 3/2003 | Shimakawa et al. ......... | 709/227 |
| 2004/0229685 | A1* | 11/2004 | Smith et al. .................... | 463/29 |
| 2005/0130728 | A1* | 6/2005 | Nguyen et al. ................ | 463/16 |
| 2006/0052168 | A1* | 3/2006 | Shacham ........................ | 463/42 |

FOREIGN PATENT DOCUMENTS

JP        2004-000680        1/2004

* cited by examiner

*Primary Examiner* — Masud Ahmed
(74) *Attorney, Agent, or Firm* — Lex IP Meister, PLLC

(57) ABSTRACT

The present invention provides a gaming system which can eliminate obstacles and drawbacks which may arise at the time of purchasing or using plural kinds of gaming machines which have different platforms thus reducing a risk and a development cost at the time of developing game software. The gaming machine includes a first unit for transmitting game result information on a game result when a game is paused or finished to the portable terminal, and the server includes a second unit for receiving the game result information transmitted from the portable terminal and identification information which the portable terminal possesses, and a third unit which allows a storage unit provided to the server to store the game result information which the server receives from the portable terminal corresponding to the identification information of the portable terminal.

6 Claims, 19 Drawing Sheets

Fig. 6

| PHONE NUMBER OF MOBILE PHONE | PLAYER ID DATA | GAME RESULT INFORMATION ||
|---|---|---|---|
| | | GAMING MACHINE KIND DATA | GAMING MACHINE KIND DATA |
| 090 -1234 - **** | P1 | A | X |
| 090 -1234 - **** | P1 | B | X |
| 090 -2345 - **** | P2 | B | X |
| 090 -2345 - **** | P2 | B | Y |
| · | · | · | · |
| · | · | · | · |

GAMING SYSTEM, GAME SERVER AND GAMING MACHINE

CROSS-REFERENCE TO THE RELATED APPLICATIONS

This application is based upon and claims the priorities from a prior Japanese patent application No. 2004-236139, filed on Aug. 13, 2004, in Japan, entire contents of which are incorporated herein by reference.

BACKGROUND OF THE INVENTION

1. Field of the Invention

The present invention relates to a gaming system, a game server and a gaming machine.

2. Description of the Related Art

Conventionally, there has been known a gaming machine on which a memory card is detachably mounted (see Japanese Patent Laid-open 2004-680, hereinafter referred to as patent document 1). In playing a game using such a gaming machine, there has been a case in which a player wants to pause a game in the midst of the game. In such a case, by allowing the player to pause the game while temporarily storing data relevant to a game result in a memory card, the player can resume the game using the data and can play the game continuously from a state of the game at which the game is paused. Accordingly, the player can arbitrarily pause and resume the game. Recently, there have been proposed games which require several hours to several tens hours to clear the games such as role playing games or simulation games. The advent of such games is attributed to the technique disclosed in the patent document 1 which allows the player to arbitrarily pause or resume the game by adopting the memory card.

Here, the video game such as the role playing game or the simulation game is a game which allows the player to enjoy the game for a long time while sharing various experiences with characters in a story developed in the game. Such a video game can give the player a chance to have empathy for the story or characters and hence, the video game can strongly attract the player's interest. Accordingly, recently, the video game constitutes a genre which occupies one main stream of games. However, since a large number of role playing games, simulation games, and the like have been proposed in a game market, unless efforts are made to differentiate one game from other games by complicating contents of the game or by adopting the sophisticated graphics, it is difficult for the game to support from the players. Such a situation sharply pushes up a development cost.

To overcome such a drawback, recently, there has been proposed a game in which contents of a game succeed the story and the characters of a preceding work and a player can use data on a game result of the preceding work. Such a game has an advantage that the empathy or the affection of the player to the story and the characters generated in the preceding work enhances the players purchasing interest. Further, since the possible number of sales of the game is predictable to some extent based on the actual number of sales of the game of the preceding work, a game manufacturer bears a little risk in investment to the game and hence, the game manufacturer can spend a large sum of money for the development of the game.

Further, a plurality of game software has been developed and marketed corresponding to plural kinds of gaming machines which have different platforms. In this case, it is possible to enhance purchasing interest of players who own respective gaming machine (game participating interest) and hence, it is possible to collect the cost for developing the game more reliably.

SUMMARY OF THE INVENTION

However, usually, the memory cards are manufactured and sold corresponding to the gaming machines and there exists no compatibility among the plural kinds of gaming machine which have different platforms. Accordingly, for example, when game software which correspond to the plural kinds of gamin machines are sold in the previous work, unless game software which correspond to the same kinds of gaming machine kinds are not sold even in a next work, there has been a drawback that depending on a player, the player cannot play the game using data relevant to the game result of the preceding work. For a game manufacturer, even when the game manufacturer develops the game software corresponding to the gaming machine which a small number of users use, it is difficult to collect the cost incurred by development. Accordingly, in developing the game software, it is preferable to investigate the number of users of the gaming machine and to determine the gaming machine to which the gaming software corresponds. However, once game software is sold corresponding to a gaming machine having a certain platform, to continuously obtain the support of the players, it is necessary to sell the game software corresponding to the gaming machine having the same platform in the next work thus arising a drawback that the cost for developing the game software is increased.

Further, the memory cards have no compatibility among the plural kinds of gaming machine which have different platforms and hence, each time a player purchases a gaming machine, he/she has to purchase a memory card and this situation discourages the player to purchase other gaming machine. This drawback also becomes an obstacle for a game manufacturer in increasing the number of sales of gaming machines.

The present invention has been made under the above-mentioned circumstances and it is an object of the present invention to provide a gaming system which can overcome obstacles and drawbacks in purchasing and using plural kinds of gaming machine which have different platforms thus decreasing the risk and the cost at the time of developing game software.

To achieve the above-mentioned object, the present invention provides the followings.

(1) In a gaming system which includes a gaming machine which is intercommunicable with a portable terminal (personal digital assistance) manipulated by a player, and a server which is intercommunicable with the portable terminal, the gaming machine includes a first unit for transmitting game result information on a game result when a game is paused or finished to the portable terminal, and the server includes a second unit for receiving the game result information transmitted from the portable terminal and identification information which the portable terminal possesses, and third unit which allows a storage unit provided to the server to store the game result information which the server receives from the portable terminal corresponding to the identification information of the portable terminal.

(2) In a game server which is communicable with a portable terminal which is mutually communicable with a gaming machine, the game server includes a second unit for receiving game result information relevant to a game result when a game is paused or finished which is transmitted to the personal terminal from the gaming machine together with the identification information which the portable terminal possesses from the portable terminal, and a unit which stores the received game result information corresponding to identification information of the portable terminal.

(3) In a gaming machine which is mutually communicable with a portable terminal, the gaming machine includes a unit which transmits game result information relevant to a game result when a game is paused or finished to the portable terminal, and a unit which performs a control to proceed the game based on the game result information when the unit receives the game result information from the portable terminal.

BRIEF DESCRIPTION OF THE DRAWINGS

FIG. 6 is a view for explaining the game result information stored in a server shown in FIG. 1;

DESCRIPTION OF THE PREFERRED EMBODIMENTS

Figure 1:
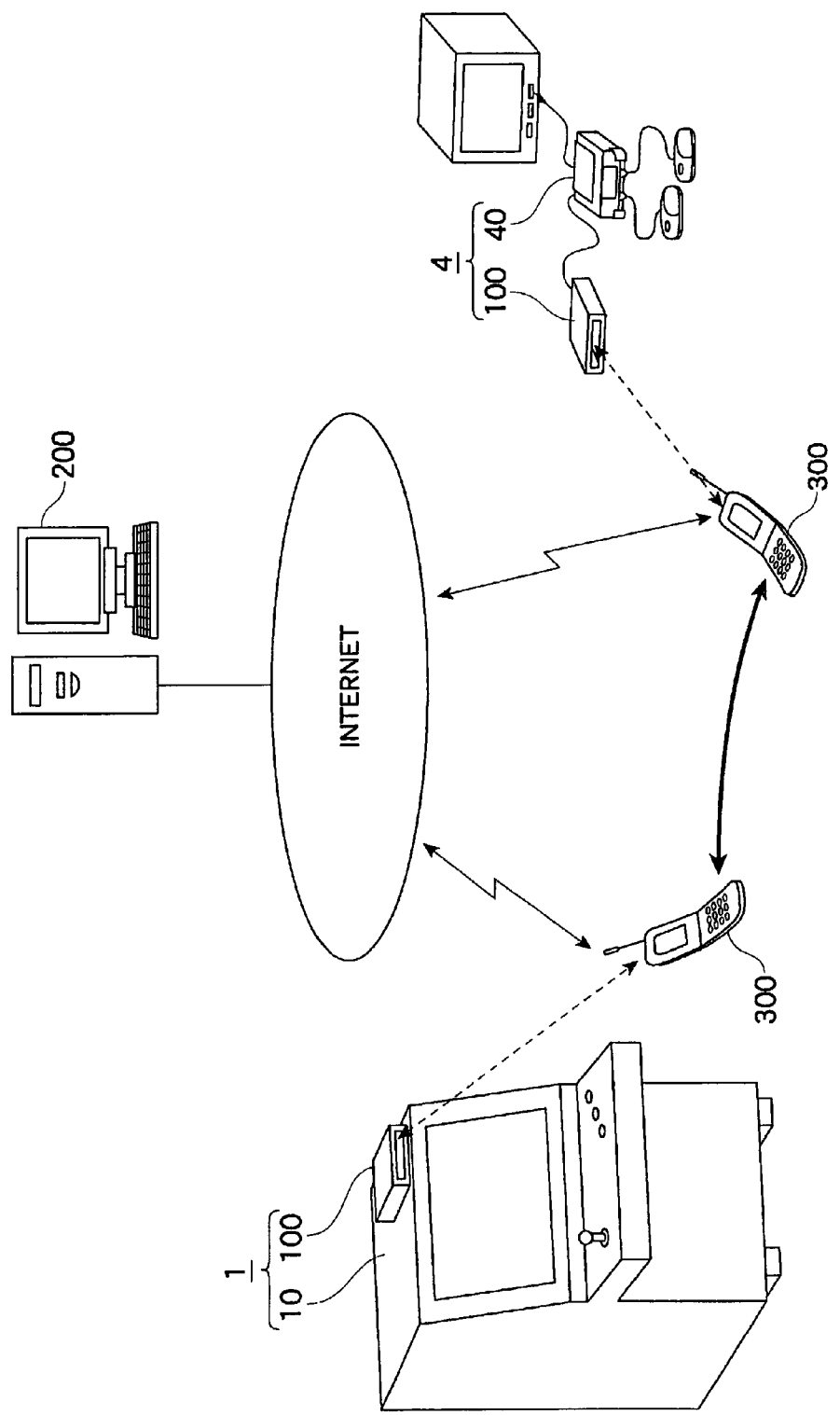
FIG. 1 is a network constitutional view showing one example of a gaming system according to the present invention.

First of all, the summary of a gaming system according to the present invention is explained in conjunction with FIG. 1.

FIG. 1 is a network constitutional view showing one example of the gaming system according to the present invention.

The business-use gaming machine 1 is constituted of a business-use gaming machine main body 10 and a communication unit 100 and is installed in a commercial facility such as a game arcade. Here, this embodiment is explained assuming that a machine kind of the business-use gaming machine main body 10 is a gaming machine "A".

The business-use gaming machine 1 corresponds to a gaming machine according to the present invention.

The business-use gaming machine main body 10 performs a video game and a player can play the video game using the business-use gaming machine main body 10. Further, the business-use gaming machine main body 10 is connected to the communication unit 100 through a cable (not shown in the drawing) and transmits a game result information on the game result when the game is paused or finished to the communication unit 100. The communication unit 100 transmits the game result information received from the business-use gaming machine main body 10 to a mobile phone 300 by a predetermined communication system (for example, IrDA or the like) using infrared rays as a communication medium.

In this manner, the business-use gaming machine 1 includes a unit which transmits the information on the game result when the game is paused or finished to the mobile phone 300.

The mobile phone 300 corresponds to portable terminal which is provided between the gaming machine and the server according to the present invention and is communicated with the gaming machine and the server respectively.

The mobile phone 300 includes a non-volatile memory 320 (not shown in the drawing) such as a flash memory, for example, wherein the non-volatile memory 320 stores the game result information received from the business-use gaming machine 1.

When the game is resumed in the business-use gaming machine 1, the game result information stored in the non-volatile memory 320 of the mobile phone 300 is transmitted to the communication unit 100 by the predetermined communication system using infrared rays as the communication medium. The communication unit 100 transmits the game result information to the business-use gaming machine main body 10 through a cable. The business-use gaming machine main body 10 advances the game based on the game result information received from the communication unit 100.

In this manner, the business-use gaming machine 1 includes the unit which controls the advancing of the game based on the game result information when the game result information is received from the mobile phone 300.

The home-use gaming machine 4 is constituted of a home-use gaming machine main body 40 and a communication unit 100. Here, this embodiment is explained assuming that a machine kind of the home-use gaming machine main body 40 is a gaming machine "B".

The home-use gaming machine 4 also corresponds to a gaming machine according to the present invention.

The home-use gaming machine main body 40 performs a video game and a player can play the video game using the home-use gaming machine main body 40.

In this embodiment, the explanation is made with respect to a case in which the video game performed using the home-use gaming machine main body 40 and the video game performed using the business-use gaming machine main body 10 have the same contents.

Further, a platform (kinds of basic software, environment, setting and the like) of the home-use gaming machine main body 40 differs from a platform of the business-use gaming machine main body 10. Accordingly, even though the game software can perform a game with the same contents, the game software which is operated in the business-use gaming machine main body 10 is not operated in the home-use gaming machine main body 40 and the game software which is operated in the home-use gaming machine main body 40 is not operated in the business-use gaming machine main body 10. Here, in this specification, a software unit a software including a program and data used by the program.

Further, the home-use gaming machine main body 40 is connected to the communication unit 100 through a cable and transmits information on a game result which is obtainable when the game is paused or finished to the communication unit 100. The communication unit 100 transmits the game result information received from the home-use gaming machine main body 40 to the mobile phone 300 by a predetermined communication system using infrared rays as a communication medium.

In this manner, the home-use gaming machine 4 includes, in the same manner as the business-use gaming machine 1, a unit which transmits the information on the game result which is obtainable when the game is paused or finished to the mobile phone 300.

The game result information received from the home-use gaming machine 4 is stored in the non-volatile memory 320 which constitutes a storing unit provided to the mobile phone 300.

When the game is resumed with the home-use gaming machine 4, the game result information stored in the non-volatile memory 320 of the mobile phone 300 is transmitted to the communication unit 100 by the predetermined communication system using infrared rays as the communication medium. The communication unit 100 transmits the game result information to the home-use gaming machine main body 40 through a cable. The home-use gaming machine main body 40 advances the game based on the game result information received from the communication unit 100.

In this manner, the home-use gaming machine 4 includes, in the same manner as the business-use gaming machine 1, a unit which controls the advancing of the game based on the game result information when the game result information is received from the mobile phone 300.

As described above, using the gaming system according to this embodiment, since the game result information can be stored in the non-volatile memory 320 provided to the mobile phone 300, it is possible to impart a function of a memory card to the mobile phone 300.

The mobile phone 300 transmits, based on an instruction inputted from the player or the like, the game result information which is received from the business-use gaming machine 1 or the home-use gaming machine 4 and is stored in the non-volatile memory 320 is transmitted to a server 200 through the Internet together with an identification information (for example, player's own telephone number of the mobile phone 300, player identification information such as the name of the player inputted by the player or the like) which the mobile phone 300 possesses.

The server 200 corresponds to a server according to the present invention. The server 200 includes a hard disc drive 206 (not shown in the drawing) which constitutes a storing unit and the game result information received from the mobile phone 300 is stored in the hard disc drive 206 corresponding to the identification information of the mobile phone 300.

In this manner, the server 200 includes a unit which allows the hard disc drive 206 which constitutes a storing unit to store the game result information received from the mobile phone 300 corresponding to the identification information of the mobile phone 300.

The mobile phone 300 transmits, based on an instruction inputted from the player or the like, a request signal which requests the transmission of the gaming result information to the server 200 together with the identification information which the mobile phone 300 possesses.

When the request signal is received from the mobile phone 300, the server 200 samples game result information corresponding to the identification information received together with the request signal from the hard disc drive 206 and transmits the game result information to the mobile phone 300 which constitutes the transmission source of the request signal.

In this manner, the server 200 includes a unit which, when the server 200 receives the request signal from the mobile phone 300, samples the game result information corresponding to the identification information which is received together with the request signal from the hard disc drive 206 which constitutes a storing unit provided to the server 200 and transmits the game result information to the mobile phone 300 which transmits the request signal.

The mobile phone 300 allows the non-volatile memory 320 to store the game result information received from the server 200.

As described above, according to the gaming system of this embodiment, by making use of the communication function of the mobile phone 300, the game result information can be transmitted to the server 200 together with the identification information of the mobile phone 300 and hence, the game result information can be stored in the server 200. Further, when necessary, the request signal from the mobile phone 300 is transmitted, the game result information is read out from the server 200 to the mobile phone 300 and the game result information is transmitted from the portable terminal 300 to the business-use gaming machine 1 or the home-use gaming machine 4 and, thereafter, the game is advanced based on the game result information. Accordingly, the function which the gaming machines perform as a memory card is not limited by the data storing capacity of the mobile phone 300 and hence, it is not necessary for the user to purchase a new memory card when the user purchases the gaming machine having a platform different from the existing platform and hence, the maker can increase the sales number of the gaming machine.

Further, the server 200 includes a unit for converting the game result information on the game result of the business-use gaming machine 1 into the game result information which the home-use gaming machine 4 can recognize and a unit for converting the game result information on the game result of the home-use gaming machine 4 into the game result information which the business-use gaming machine 1 can recognize.

In this embodiment, the explanation is made with respect to a case in which the gaming machine (the business-use gaming machine 1 or the home-use gaming machine 4) is constituted such that the gaming machine main body (the business-use gaming machine main body 10 or the home-use gaming machine main body 40) is separated from the communication unit and the gaming machine main body and the communication unit are connected using a cable. However, the present invention is not limited to such a case. For example, the gaming machine main body and the communication unit may be integrally constituted. Further, the gaming machine may include unit which allows the gaming machine per se to perform the communication with the portable terminal.

Further, in this embodiment, the explanation is made with respect to a case in which the game performed using the business-use gaming machine 1 (gaming machine "A") and the game performed using the home-use gaming machine 4 (gaming machine "B") are the same. However, the present invention is not limited to such a case and these games may be games which are relevant to each other. For example, a story, characters or the like of one game are succeeded to another game.

Next, the explanation is made with respect to the respective devices which constitute the gashing system shown in FIG. 1.

Figure 2:
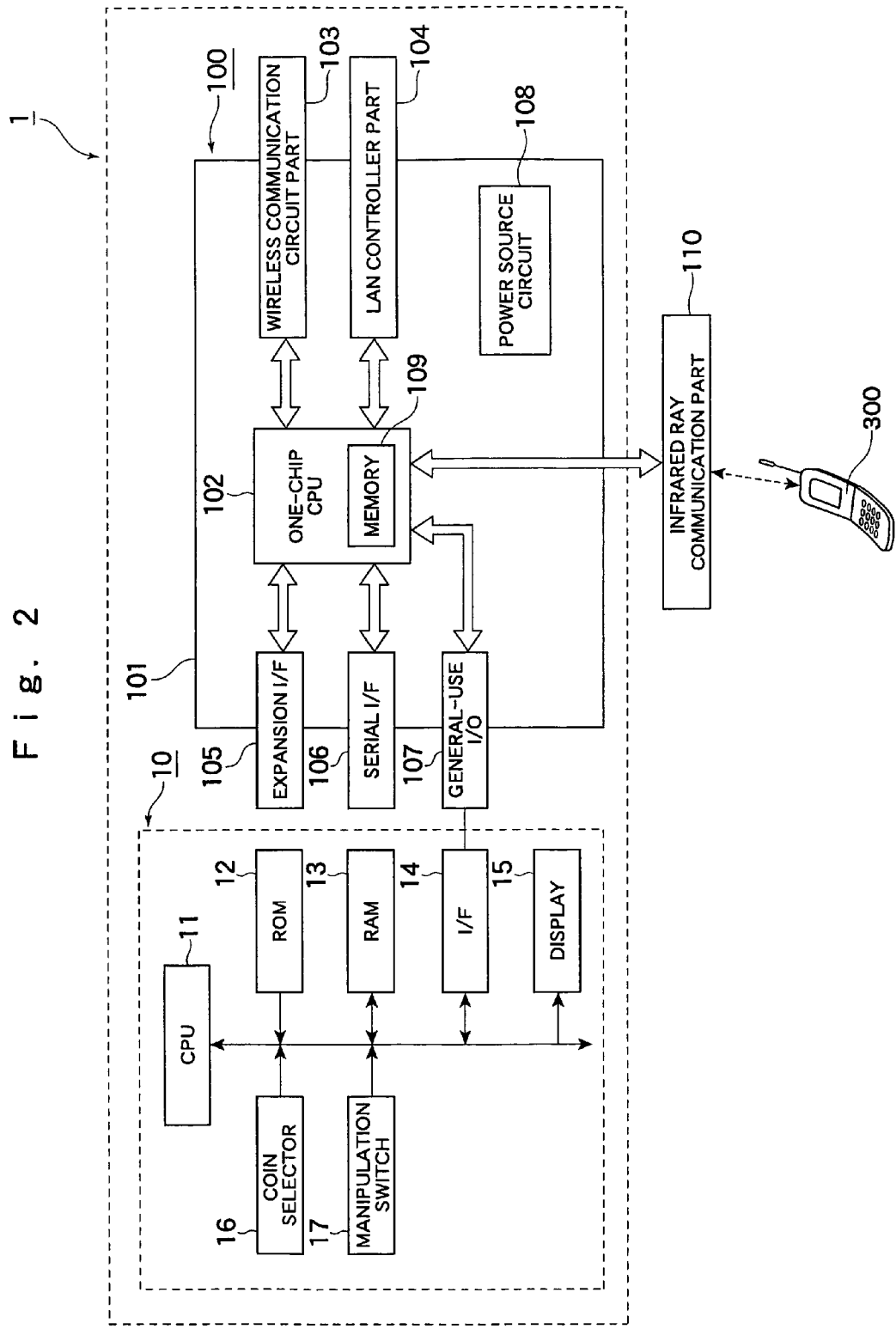
FIG. 2 is a block diagram showing an inner structure of a business-use gaming machine shown in FIG. 1.

FIG. 2 is a block diagram showing the inner structure of the business-use gaming machine 1 shown in FIG. 1.

The business-use gaming machine 1 is constituted of the business-use gaming machine main body 10 and the communication unit 100.

The business-use gaming machine main body 10 includes a CPU 11 which constitutes an arithmetic processing unit, a ROM 12 which constitutes a main storing unit, a RAM 13 which constitutes an auxiliary storing unit, an I/F (interface) 14 for performing the communication with the communication unit 100, a display 15 which constitutes a display device, a coin selector 16 which detects a coin which is inserted by a player and an operation switch 17 which constitutes an input device.

In the ROM 12, basic software (operating system) for realizing basic functions of the business-use gaming machine main body 10 and a game software which is operated on this basic software.

The ROM 12 may be a storing medium such as a semiconductor memory which is incorporated in the business-use gaming machine main body 10 or may be a removable storing medium. Further, the ROM 12 may be constituted of both of the incorporated storing medium and the removable storing medium. In this case, when the storing medium which is incorporated in the business-use gaming machine main body 10 is allowed to store the basic game software and the removable storing medium is allowed to store the game software, by exchanging the removable storing medium, the contents of the game performed with the business-use gaming machine main body 10 can be changed.

Further, data which can be stored in the removable storing medium out of various data stored in the ROM 12 may be configured to be read by a driver such as a hard disc drive, an optical disc drive, a flexible disc drive, a silicon disc drive, a cassette medium reading device, for example. In this case, the storing medium is, for example, a hard disc, an optical disc, a flexible disc, a CD, a DVD, a semiconductor memory or the like.

The CPU 11 is operated based on the basic software stored in the ROM 12. Further, in response to a signal from the coin selector 16 or the operation switch 17, the program of the game software is executed. For example, arithmetic processing relevant to the advancing of the game, the generation of the game result information, a display control of the display 15 and the like are executed.

The game result information includes, for example, data indicative of a game kind, data indicative of a kind of a gaming machine with which the game is performed or data indicative of the result of the game.

The RAM 13 temporarily stores data obtained from the result of the arithmetic processing, the game result information and the like. The CPU 11 transmits the game result information stored in the RAM 13 to the communication unit 100 through I/F 14 at predetermined timing.

The communication unit 100 is constituted of a body 101 and an infrared ray communication part 110. The body 101 includes a one chip CPU (hereinafter simply referred to as CPU) 102 having a memory (RAM) 109. To the CPU 102, a wireless communication circuit part 103, a LAN controller part 104, an expansion I/F 105, a serial I/F 106 and a general-purpose I/O 107 are connected. Further, a power source circuit 108 is mounted on the body 101.

To the general-purpose I/O 107, the I/F 14 of the business-use gaming machine main body 10 is connected through a cable. The game result information transmitted from the CPU 11 of the business-use gaming machine main body 10 is inputted to the general purpose I/O 107 through the cable from the I/F 14. In the memory 109, the game result information inputted to the general purpose I/O 107 is stored.

The infrared ray communication part 110 includes, although not shown in the drawing, an infrared ray receiving element and an infrared ray emitting element and performs the communication with the mobile phone 300 by a predetermined communication system (for example, IrDA or the like) using infrared rays as a communication medium.

Further, the ROM (not shown in the drawing) is incorporated in the CPU 102 and stores a program for realizing the function of the communication unit 100 therein. The CPU 102 executes the following processing (A) and (B) by reading and executing the program.

(A) The CPU 102 receives an output request signal which requests the outputting of the game result information from the mobile phone 300 using the infrared ray communication part 109.

(B) The CPU 102 transmits, when the output request signal is received in the above-mentioned proceeding (A), the game result information stored in the memory 109 to the mobile phone 300 using the infrared ray communication part.

Although the wireless communication circuit part 103, the LAN controller part 104, the expansion I/F 105 and the serial I/F 106 are not used in this embodiment, the respective parts have following functions.

The wireless communication circuit part 103 enables the transmission and the reception of data to and from the outside using the wireless and may adopt, for example, a card kind expansion device such as a PCMCIA kind card, a MiniPCI kind card. The LAN controller part 104 enables the transmission and the reception of data to and from the outside using the wire. To the expansion I/F 105, various peripheral devices can be connected. The serial I/F 106 is an interface for performing a serial transmission and may adopt, for example, a serial transmission system such as RS-232, RS-422.

Figure 3:
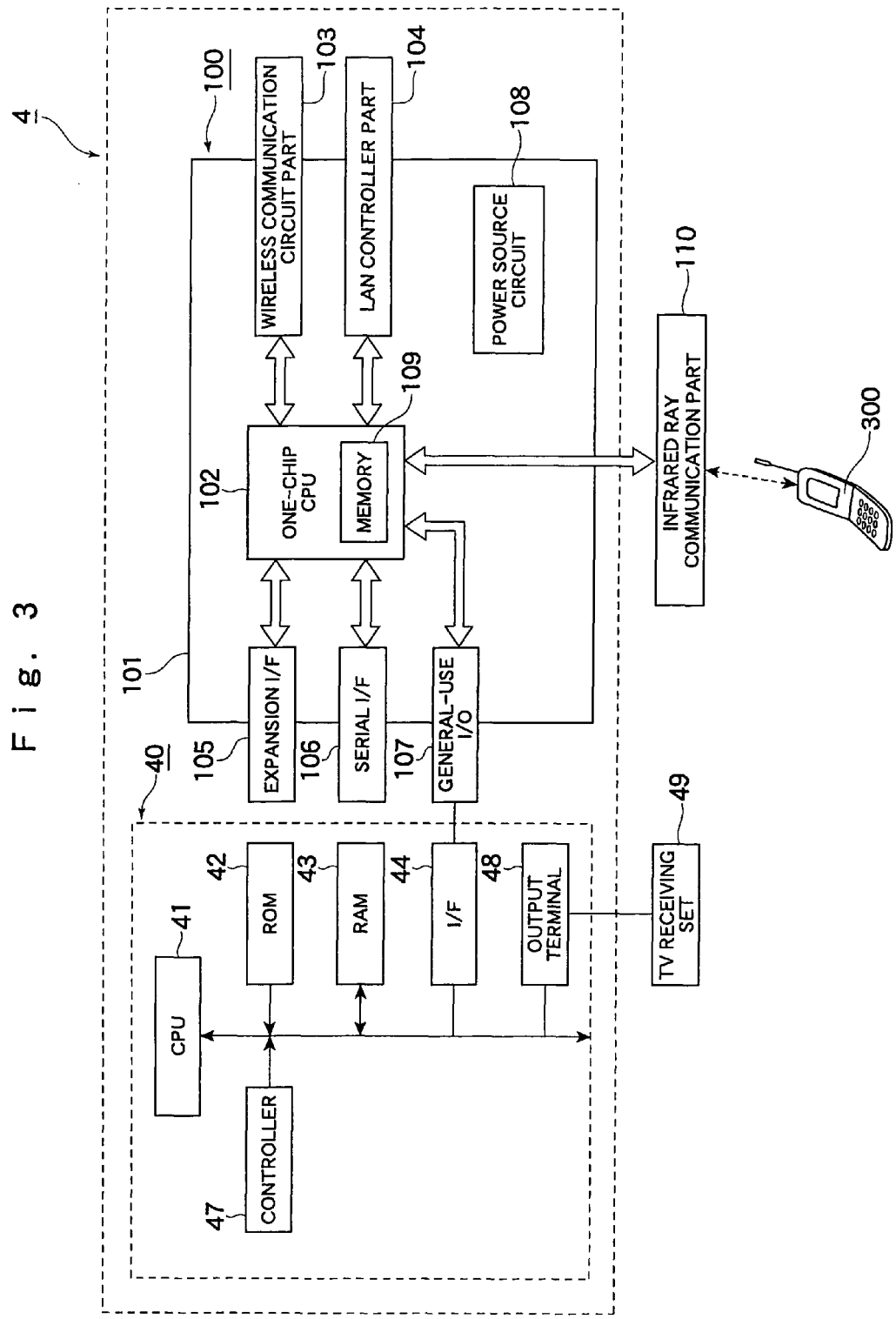
FIG. 3 is a block diagram showing an inner structure of a home-use gaming machine shown in FIG. 1.

FIG. 3 is a block diagram showing the inner constitution of the home-use gaming machine 4 shown in FIG.

The home-use gaming machine 4 is constituted of the home-use gaming machine main body 40 and the communication unit 100.

The home-use gaming machine main body 40 includes a CPU 41 which constitutes an arithmetic processing unit, a ROM 42 which constitutes a main storing unit, a RAM 43 which constitutes an auxiliary storing unit, an I/F 44 which allows the home-use gaming machine main body 40 to communicate with the communication unit 100, a controller 47 which constitutes an input device and an external terminal 48 for outputting an image signal, a voice signal or the like to the TV receiving set 49.

In the ROM 42, basic software (operating system) for realizing basic functions of the home-use gaming machine main body 40 and game software which is operated on this basic software are stored.

The ROM 42 may be, for example, a storing medium such as a semiconductor memory which is incorporated in the home-use gaming machine main body 40 or may be a storing medium which is removably mounted on the home-use gaming machine main body 40. Further, the ROM 42 may be constituted of both of the incorporated storing medium and the removable storing medium. In this case, when the storing medium which is incorporated in the home-use gaming machine main body 40 stores the basic software and the removable storing medium stores the game software, by exchanging the removable storing medium, the contents of the game performed using the home-use gaming machine main body 40 can be changed.

Further, data which can be stored in the removable storing medium out of various data stored in the ROM 42 may be configured to be read by a driver such as a hard disc drive, an optical disc drive, a flexible disc drive, a silicon disc drive, a cassette medium reader. In this case, the storing medium is, for example, a hard disc, an optical disc, a flexible disc, a CD, a DVD, a semiconductor memory or the like.

The CPU 41 is operated based on the basic software stored in the ROM 12. Further, in response to a signal from the controller 47, the programs of the game software are executed. For example, the arithmetic processing relevant to the advancing of the game, the generation of the game result information, the transmitting of various signals to the output terminal 48 and the like are executed.

The RAM 43 temporarily stores data obtained from the result of the arithmetic processing, the game result information and the like. The CPU 41 transmits the game result information stored in the RAM 43 to the communication unit 100 through I/F 44 at predetermined timing.

Since the communication unit 100 has the same constitution as the constitution of the communication unit 100 shown in FIG. 2 and has been already explained, the explanation thereof is omitted here.

Figure 4:
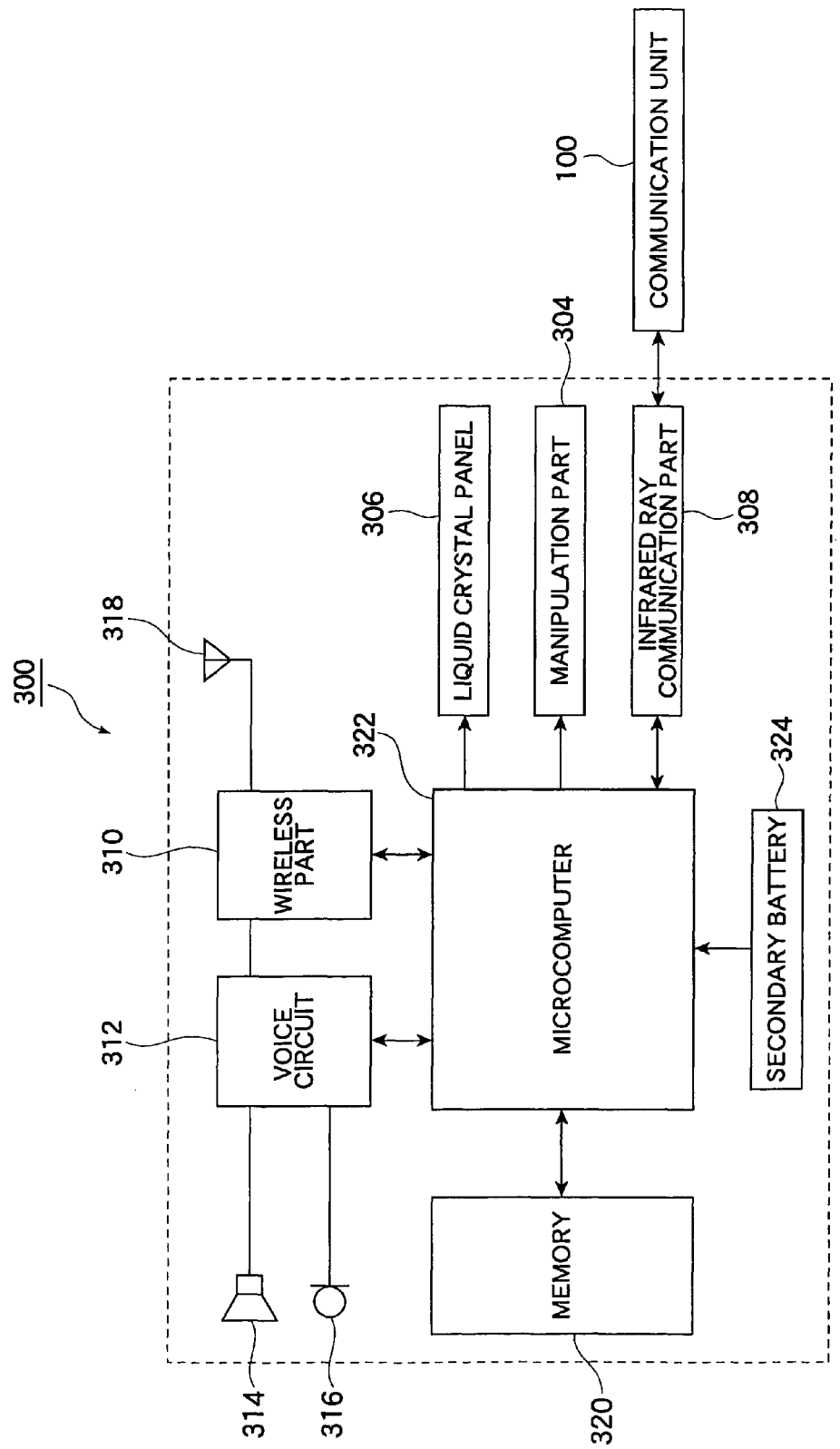
FIG. 4 is a block diagram showing the inner constitution of a mobile phone shown in FIG. 1.

FIG. 4 is a block diagram showing the inner constitution of the mobile phone 300.

Here, the mobile phone 300 corresponds to the portable terminal of the present invention.

The mobile phone 300 includes an operation part 304 which constitutes an input device, a liquid crystal panel 306 which constitutes a display device, an infrared ray communication part 308 which includes an infrared ray receiving element (not shown in the drawing) and an infrared ray emitting element (not shown in the drawing), a wireless part 310, a voice circuit 312, a speaker 314, a microphone 316, a transmission/reception antenna 318, a nonvolatile memory 320, a microcomputer 322 and a secondary cell 324.

The wireless part 310 is controlled by the microcomputer 322 and performs transmission and reception of signals to and from a base station using an electric wave as a medium through the transmission/reception antenna 318. The voice circuit 312 outputs a reception signal outputted from the wireless part 310 via the microcomputer 322 to the speaker 314 and, at the same time, outputs a voice signal outputted from the microphone 316 as a transmission signal to the wireless part 310 via the microcomputer 322.

The speaker 314 converts the reception signal outputted from the voice circuit 312 to the reception voice and outputs the reception voice and, the microphone 316 converts the transmission voice uttered by an operator to a voice signal and outputs the voice signal to the voice circuit 312. The nonvolatile memory 320 stores various data and various programs in a nonvolatile manner. The secondary cell 324 supplies power to the respective circuits. The microcomputer 322 is constituted of a CPU, a ROM and a RAM and executes, for example, incoming/outgoing call processing of the phone, creation/transmission/reception processing of e-mail, processing on the Internet and the like. Here, the microcomputer 322 executes the transmission and reception of e-mail and the transmission and reception of data via the Internet using the wireless part 310 and the transmission/reception antenna 318.

The microcomputer 322 downloads, based on a predetermined instruction which is inputted using the operation part 304, a predetermined application from the server 200 and allows the nonvolatile memory 320 to store the application. Thereafter, the microcomputer 322 reads out the programs which are contained in the application from the nonvolatile memory 320 and executes the programs. Accordingly, the microcomputer 322 functions as described in the following processing (i) to (vii).

(i) The microcomputer 322 transmits, in response to the instruction which the player inputs using the operation part 304, an output request signal which requests the outputting of the game result information to the communication unit 100 which is provided to the business-use gaming machine 1 or the home-use gaming machine 4 using the infrared ray communication part 308.

(ii) The microcomputer 322 receives the game result information from the communication unit 100 provided to the business-use gaming machine 1 or the home-use gaming machine 4.

(iii) The microcomputer 322 allows the nonvolatile memory 320 to store the game result information received in the above-mentioned processing (ii).

(iv) The microcomputer 322 transmits, in response to an instruction which is inputted using the operation part 304, the game result information stored in the nonvolatile memory 320 together with the identification information on the mobile phone 300 (for example, owner's telephone number of the mobile phone 300, player identification information such as a name of the player inputted by the player by operating the operation part 304 or the like) to the server 200 through the Internet.

(v) The microcomputer 322 transmits, in response to the instruction which is inputted using the operation part 304, the request signal which requests the transmission of the game result information together with the identification information on the mobile phone 300 to the server through the Internet.

(vi) The microcomputer 322 receives the game result information from the server 200 through the Internet and allows the nonvolatile memory 320 to store the game result information.

(vii) The microcomputer 322 transmits, in response to an instruction which is inputted using the operation part 304, the game result information stored in the nonvolatile memory 320 to the business-use gaming machine 1 or the home-use gaming machine 4 using the infrared ray communication part 308.

In this embodiment, the explanation is made with respect to the case in which the mobile phone 300 downloads the application from the server 200. However, the present invention is not limited to such a case and it may be configured that, for example, the application is preliminarily stored (preinstalled) in the storing unit in the portable terminal.

Figure 5:
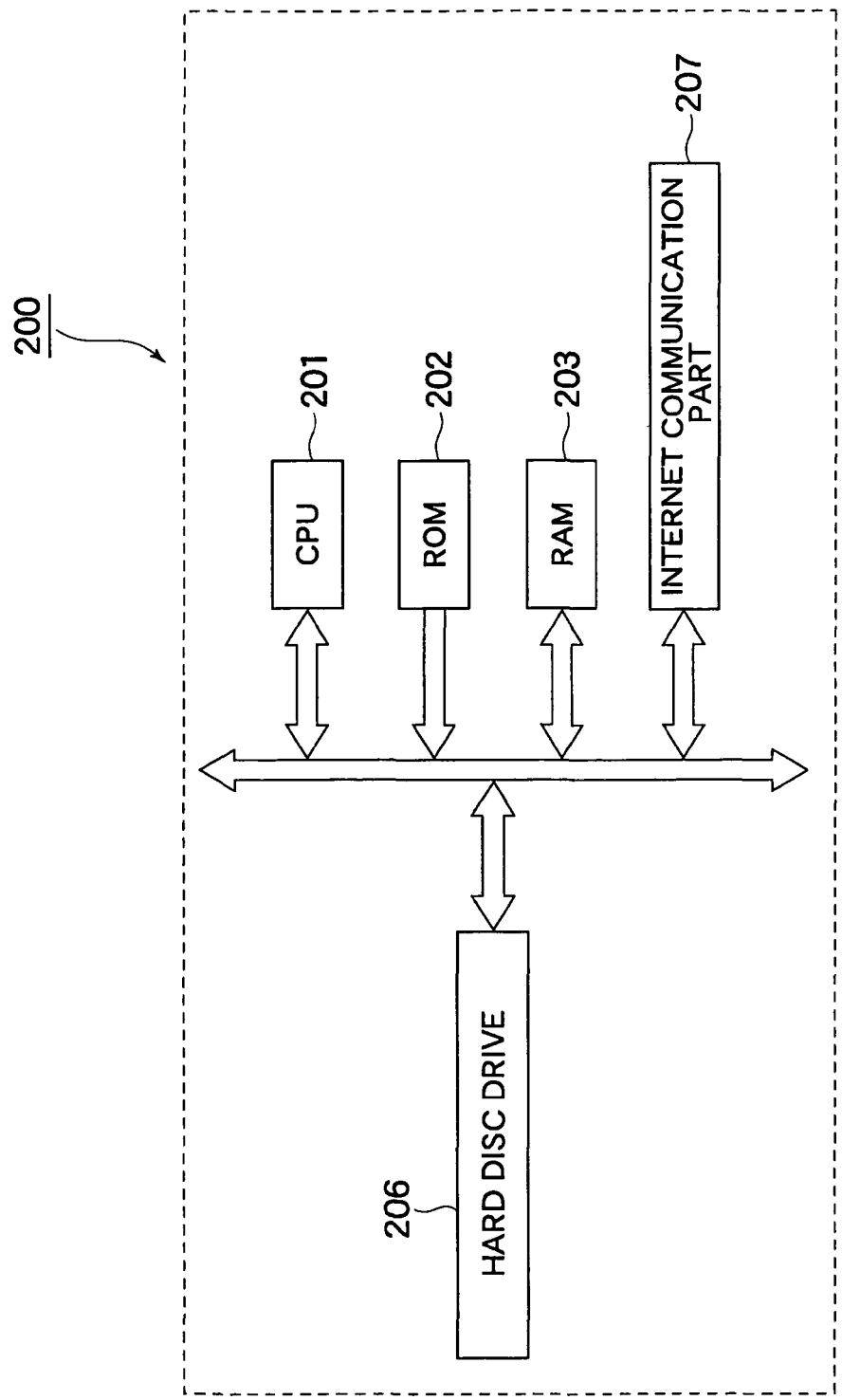
FIG. 5 is a block diagram showing the inner constitution of a server shown in FIG. 1.

FIG. 5 is a block diagram showing the inner constitution of the server 200 shown in FIG. 1.

The server 200 includes a CPU 201 which constitutes an arithmetic processing unit, a ROM 202, a RAM 203, a hard disc drive 206 and an Internet communication part 207.

The hard disc drive 206 corresponds to the storing medium and stores the game result information corresponding to the identification information on the mobile phone 300.

FIG. 6 is a view for explaining the game result information which is stored in the hard disc drive 206 in the server 200.

Here, in the drawing, a mobile phone telephone number and player ID data correspond to the identification information according to the present invention.

The hard disc drive 206 stores the game result information corresponding to the mobile phone telephone number and the player ID data. The game result information includes gaming machine classification data indicative of gaming machine kind and gaming machine classification data indicative of game kind. Here, although not shown in the drawing, the game result information includes various data indicative of the game result (for example, data indicative of an ability level of a character which appears in the game, data indicative of the advancing state of the game and the like).

To be more specific, two game result information are stored in the hard disc drive 206 corresponding to the mobile phone telephone number "090-1234-****" and the player ID data "P1". That is, the game result information which includes the gaming machine classification data "A" and the gaming machine classification data "X" and the game result information which includes the gaming machine classification data "B" and the gaming machine classification data "X" are stored. In this case, the player can play the games using two gaming machines and one game software.

Further, two game result information are stored corresponding to the mobile phone telephone number "090-2345-****" and the player ID data "P2". That is, the game result information which includes the gaming machine classification data "B" and the gaming machine classification data "X" and the game result information which includes the gaming machine classification data "B" and the gaming machine classification data "Y" are stored. In this case, the player can play the games using one gaming machine and two game software.

Further, the hard disc drive 206 stores an application for allowing the mobile phone 300 to download the data. The Internet communication part 207 enables the communication through the Internet. The CPU 201 performs the communication with the mobile phone 300 using the Internet communication part 207 through the Internet.

Hereinafter, processing which are executed in respective devices constituting the gaming system according to the present invention are explained.

Figure 7:
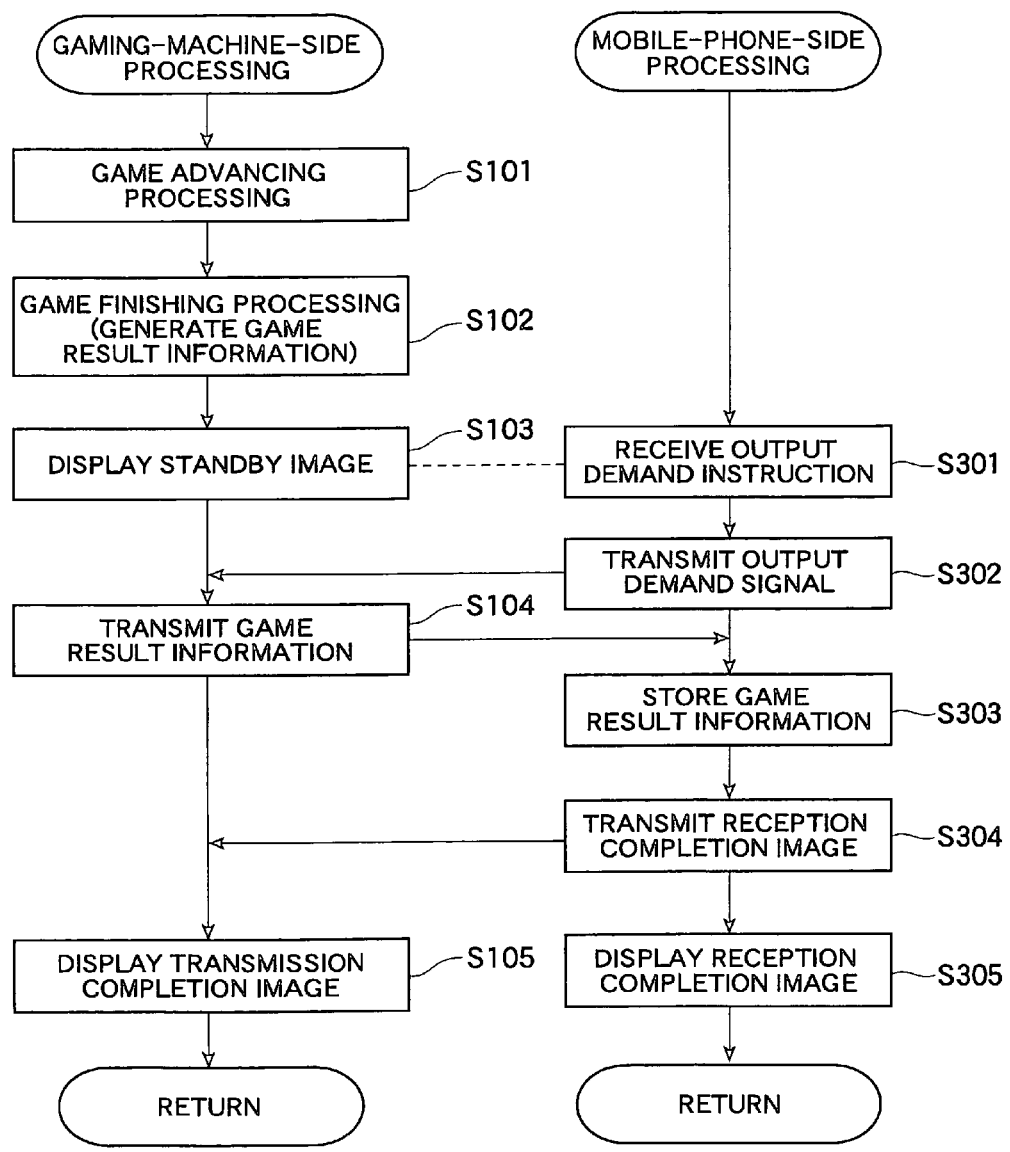
FIG. 7 is a flow chart showing a flow of processing executed in the business-use gaming machine and the mobile phone when a game is finished.

FIG. 7 is a flowchart showing a flow of the processing which is executed in the business-use gaming machine 1 and the mobile phone 300 when the game is finished.

FIG. 8 is a view showing one example of an image displayed on the mobile phone 300 when the processing shown in FIG. 7 is executed.

First of all, the business-use gaming machine 1 performs the game advancing processing (step S101).

In this processing, the CPU 11 provided to the business-use gaming machine main body 10 reads out the program of game software which is stored in the ROM 12 and performs various processing relevant to the advancing of the game such as, for example, arithmetic processing relevant to the advancing of the game or display control of the display 15. At this time, the CPU 11 temporarily stores data obtained as the result of the arithmetic processing or the like in the RAM 13.

Next, an instruction which finishes the game is inputted by the player using the operation switch 17 or a condition for finishing the game (for example, a game-clear, a game-over or the like) is established, the business-use gaming machine 1 performs the game finishing processing (step S102).

In this processing, the CPU 11 provided to the business-use gaming machine main body 10 executes various processing relevant to the finishing of the game and, at the same time, generates the game result information based on the data which is temporarily stored in the RAM 13. The game result information includes, for example, data indicative of a game kind, data indicative of a game kind with which the game is performed and data indicative of a game result of the game.

Next, the business-use gaming machine 1 performs display of a standby image (step S103).

The standby image which is displayed in the step S103 is an image indicating that the inputting of the output request signal from the mobile phone 300 is invited.

The CPU 11 of the business-use gaming machine main body 10 performs processing that predetermined image data out of image data stored in the ROM 12 is read out and the image is displayed on the display 15.

When the display of the standby image is performed in the business-use gaming machine 1, according to the contents of the standby image, the player can grasp that the inputting of the output request signal from the mobile phone 300 is accepted.

The mobile phone 300 executes, in response to an instruction inputted by the player using the operation part 304, processing which accepts the inputting of the instruction which requests the output of the game result information from the business-use gaming machine 1 (step S301).

Figure 8A:
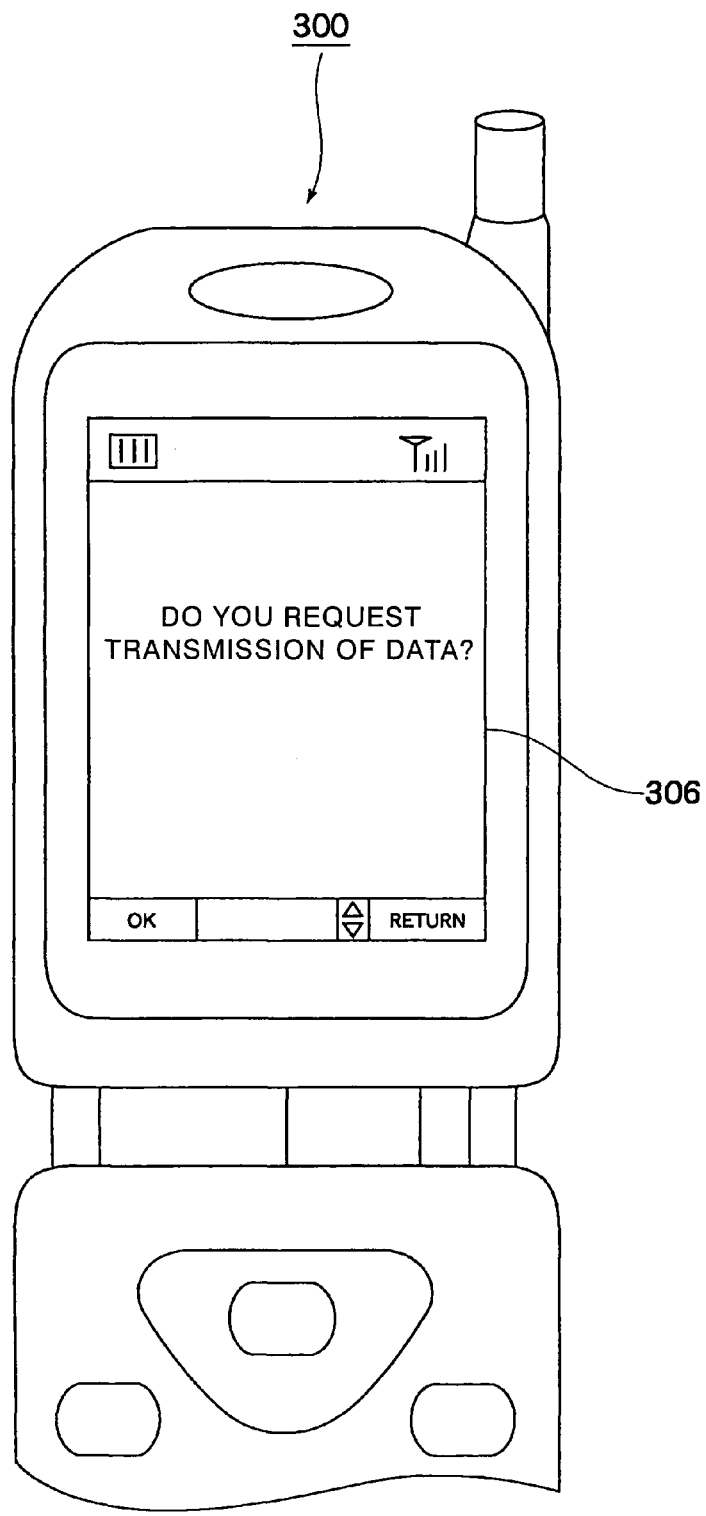
FIG. 8A and FIG. 8B are views showing one example of an image displayed on the mobile phone when the processing shown in FIG. 7 is executed.
Figure 8B:
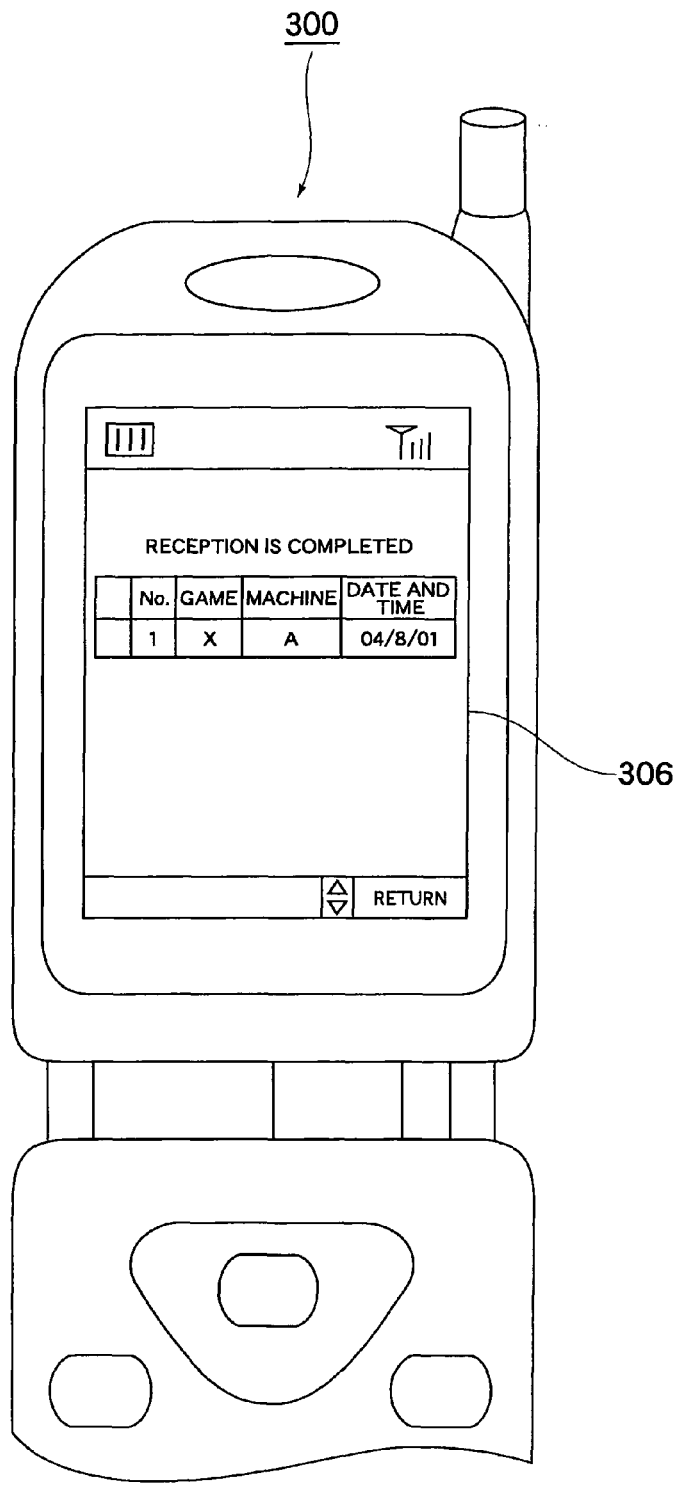

In the processing, the microcomputer 322 of the mobile phone 300 reads out predetermined image data out of image data stored in the nonvolatile memory 320 and allows the liquid crystal panel 306 to display, for example, such an image as shown in FIG. 8A.

In the center part of the liquid crystal panel 306, an image indicative of contents of an instruction of "Do you request transmission of data?" is displayed and an image indicative of choices of "OK" and "RETURN" is displayed on the lower side of the liquid crystal panel 306. At this time, the player can, by selecting the choice of "OK" by operating the operation part 304, input an instruction which requests the outputting of the game result information to the business-use gaming machine 1.

When the instruction which requests the outputting of the game result information is inputted to the business-use gaming machine 1, the mobile phone 300 transmits an output requesting signal (step S302).

In the processing, the microcomputer 322 of the mobile phone 300 transmits the output request signal to the communication unit 100 of the business-use gaming machine 1 using the infrared ray communication part 308.

On the other hand, upon receiving the output request signal from the mobile phone 300, the business-use gaming machine 1 transmits the game result information to the mobile phone 300 (step S104).

In this processing, upon receiving the output request signal from the mobile phone 300 using the infrared ray communication part 110, the CPU 102 provided to the communication unit 100 of the business-use gaming machine 1 transmits a predetermined signal to the business-use gaming machine main body 10. On the other hand, upon receiving the signal from the communication unit 100, the CPU 11 of the business-use gaming machine main body 10 reads out the game result information stored in the RAM 13 and transmits the game result information to the communication unit 100. The CPU 102 provided to the communication unit 100 temporarily stores, upon receiving the game result information from the business-use gaming machine main body 10, the game result information in the memory 109 and thereafter, transmits the game result information stored in the memory 109 to the mobile phone 300 using the infrared ray communication part 110.

The microcomputer 322 provided to the mobile phone 300 allows, when the game result information is received from the business-use gaming machine 1 using the infrared ray communication part 308, the nonvolatile memory 320 to store the game result information (step S303).

When the reception of the game result information from the business-use gaming machine 1 is finished, the microcomputer 322 provided to the mobile phone 300 performs following processing. That is, the microcomputer 322 transmits a reception completion notifying signal to the business-use gaming machine 1 using an infrared ray communication part 308 (step S304) and, subsequently, reads out predetermined image data out of image data which are preliminarily stored in the nonvolatile memory 320 and allows the liquid crystal panel 306 to display an image shown in FIG. 8B, for example (step S305).

In the center part of the liquid crystal panel 306, an image indicating "RECEPTION IS COMPLETED" and an image indicative of information on the game result information such as a game kind which is indicative by the received game result information, a gaming machine kind, date and time when the game result information is generated, for example, are displayed.

Next, when the business-use gaming machine 1 receives the reception completion notifying signal from the mobile phone 300, the CPU 11 of the business-use gaming machine main body 10 reads out predetermined image data out of image data stored in the ROM 12 and allows the display 15 to display the image indicating that the transmission of the game result information is finished (step S105).

When the processing shown in FIG. 7 is executed, the game result information of the game result of the business-use gaming machine 1 is supplied to the mobile phone 300.

Figure 9:
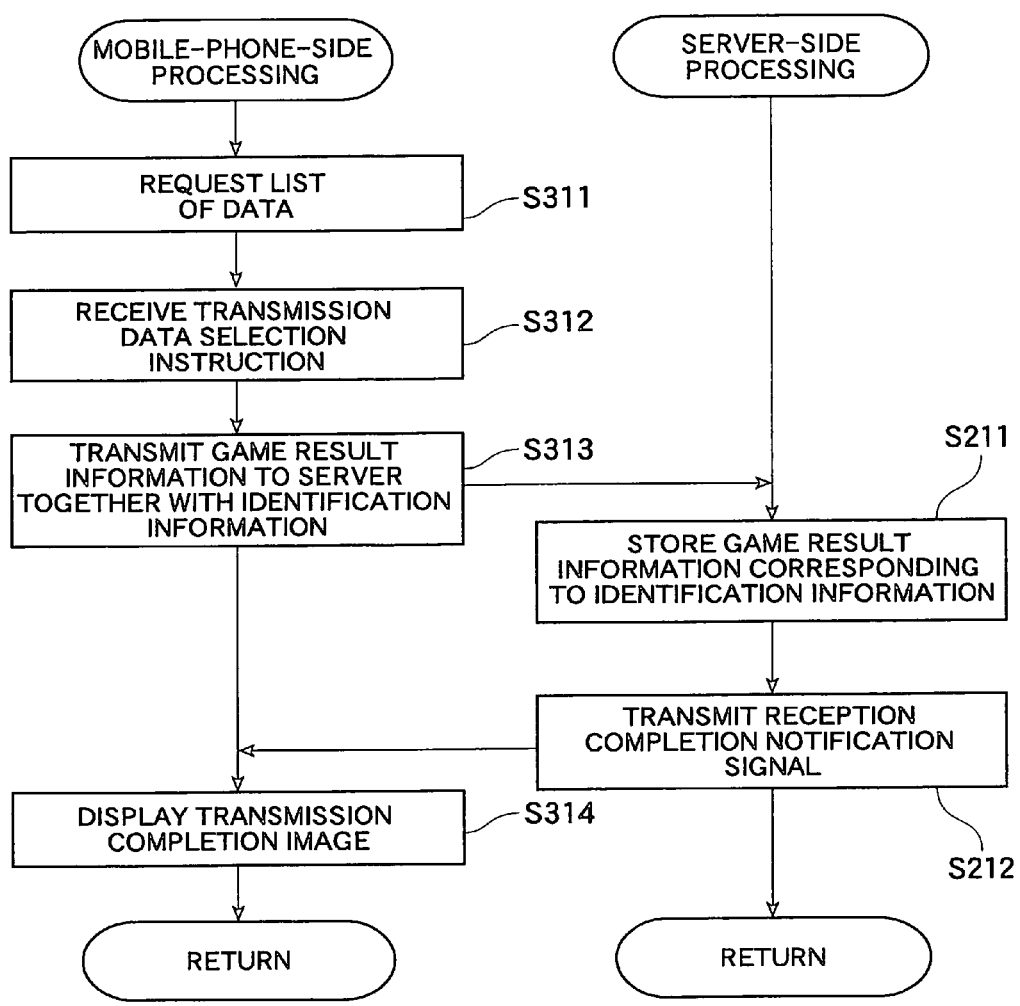
FIG. 9 is a flow chart showing a flow of processing which is executed between the mobile phone and the server when the mobile phone transmits the game result information to the server.

FIG. 9 is a flowchart showing a flow of the processing which is executed in the mobile phone 300 and the server 200 when the mobile phone 300 transmits the game result information to the server 200.

FIG. 10 is a view showing one example of an image displayed on the mobile phone 300 when the processing shown in FIG. 9 is executed.

Figure 10A:
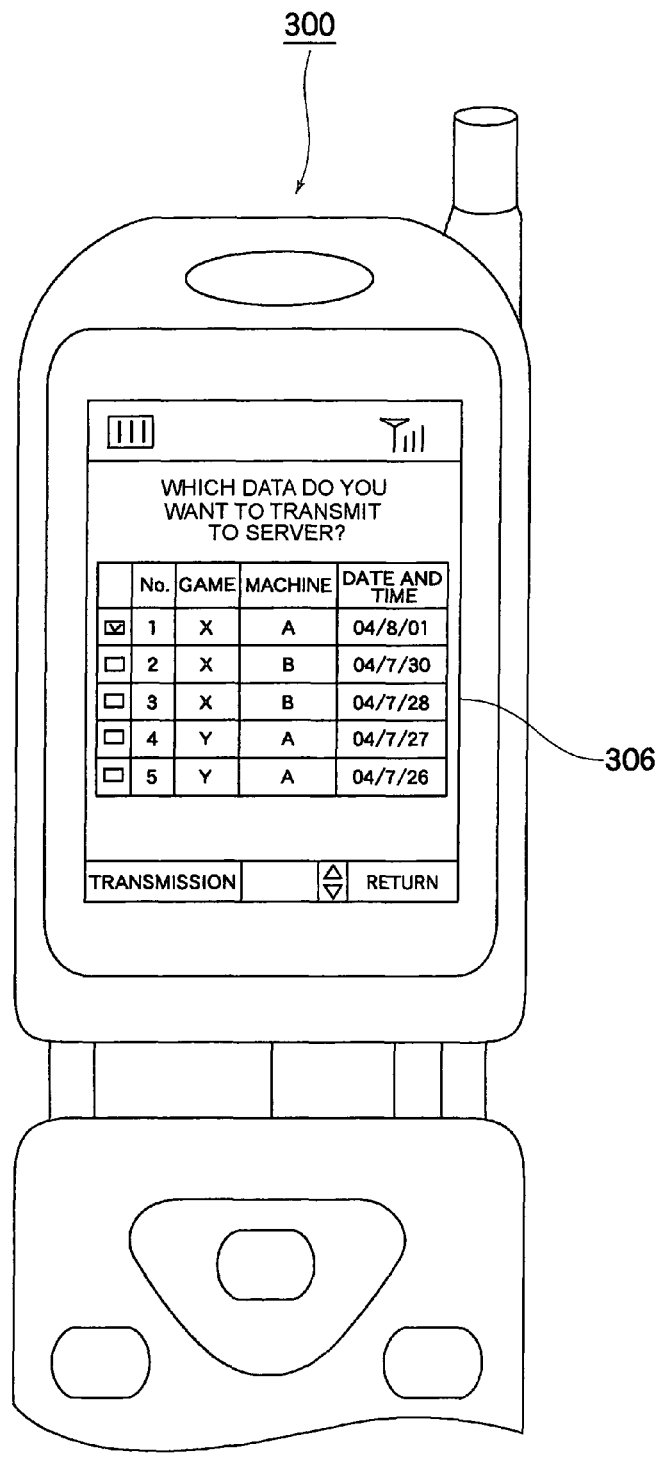
FIG. 10A and FIG. 10B are views showing one example of an image displayed on the mobile phone when the processing shown in FIG. 9 is executed.
Figure 10B:
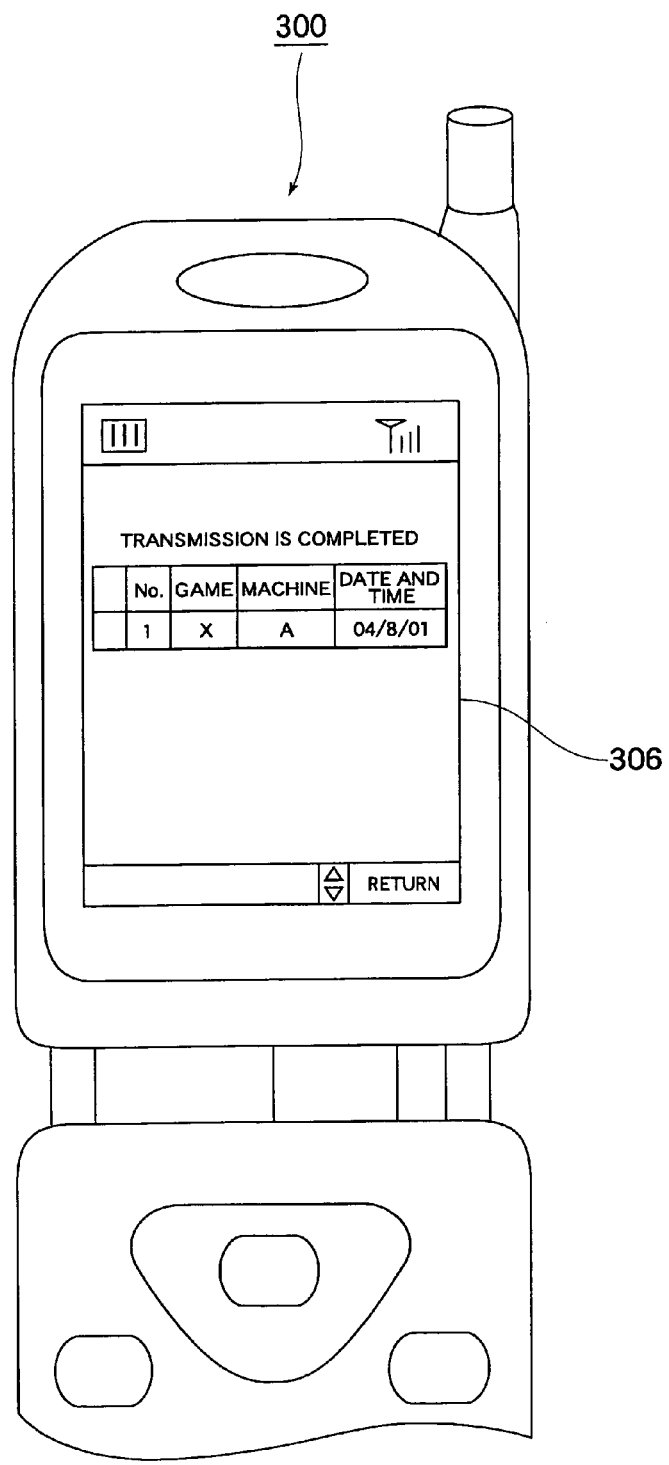

First of all, based on the game result information stored in the nonvolatile memory 320, the microcomputer 322 provided to the mobile phone 300 reads out image data stored in the same nonvolatile memory 320 and, allows the liquid crystal panel 306 to display such an image as shown in FIG. 10A, for example.

On the upper side of the liquid crystal panel 306, an image which indicates "WHICH DATA DO YOU WANT TO TRANSMIT TO THE SERVER?" and invites the selection of the game result information to transmit is displayed.

Further, in the center part of the liquid crystal panel 306, an image indicative of a list of the game result information stored in the nonvolatile memory 320 is displayed. In this list, the images indicative of five game result information are arranged and the respective images indicate the respective information on the game result information (for example, game kinds, gaming machine kinds, date and time when the game result information are generated and the like).

To be more specific, the game result information of No. 1 is game result information of a game "X" which can be recognized by a gaming machine "A" and date and time when the game result information is generated are "04/8/01".

The game result information of No. 2 is a game result information of the game "X" which can be recognized by a gaming machine "B" and date and time when the game result information is generated are "04/7/30".

The game result information of No. 3 is game result information of the game "X" which can be recognized by the gaming machine "B" and date and time when the game result information is generated are "04/7/28".

The game result information of No. 4 is game result information of a game "Y" which can be recognized by a gaming machine "A" and date and time when the game result information is generated are "04/7/27".

The game result information of No. 5 is game result information of the game "Y" which can be recognized by a gaming machine "A" and date and time when the game result information is generated are "04/7/26".

Further, check boxes are displayed on the right side next to the images indicative of the respective game result information and an instruction which selects whether the game result information is transmitted to the server 200 or not can be inputted corresponding to whether a check is inputted to the check box or not. FIG. 8A shows a state that a check is inputted in the check box displayed on the right side next to the image indicative of the game result information of No. 1.

Further, on the lower side of the liquid crystal panel 306, an image indicative of choices of "TRANSMIT", "RETURN" is displayed. For example, when the image shown in FIG. 8A is displayed on the liquid crystal panel 306, the player can input an instruction which transmits the game result information of No. 1 to the server 200 by selecting the choice of "TRANSMIT" by operating the operation part 304.

Next, the microcomputer 322 of the mobile phone 300 accepts the inputting of an instruction which selects the game result information to transmit (step S312) and transmits, when the instruction is inputted, out of the game result information stored in the nonvolatile memory 320, the selected game result information together with the identification information on the mobile phone 300 (for example, owner's telephone number of the mobile phone 300, player identification information such as a name of the player inputted by the player) to the server 200 through the Internet (step S313).

For example, when the choice of "TRANSMIT" is selected when the image shown in FIG. 8A is displayed on the liquid crystal panel 306, the microcomputer 322 samples the game result information of No. 1 out of the game result information stored in the nonvolatile memory 320 and transmits the game result information together with the identification information on the mobile phone 300 (for example, owner's telephone number of the mobile phone 300, player identification information such as a name of the player inputted by the player) to the server 200 through the Internet.

On the other hand, upon receiving the game result information together with the identification information on the mobile phone 300 from the mobile phone 300 using the Internet communication part 207 using the Internet communication part 207, as explained in conjunction with FIG. 6, the CPU 201 provided to the server 200 allows the hard disc drive 206 to store the game result information corresponding to the identification information (step S211).

Subsequently, the CPU 201 provided to the server 200 transmits a reception completion notifying signal which indicates that the reception of the game result information is finished to the mobile phone 300 using the Internet communication part 207 through the Internet (step S212).

Upon receiving the reception completion notifying signal through the Internet, the microcomputer 322 provided to the mobile phone 300 executes the following processing. That is, the microcomputer 322 reads out predetermined image data out of image data which are preliminarily stored in the nonvolatile memory 320 and allows the liquid crystal panel 306 to display an image shown in FIG. 10B, for example (step S314).

In the center part of the liquid crystal panel 306, an image indicating "TRANSMISSION IS COMPLETED" and an image indicative of information on the game result information such as a game kind which is indicated by the game result information, a gaming machine kind, date and time when the game result information is generated, for example.

By executing the processing shown in FIG. 9, the game result information stored in the nonvolatile memory 320 of the mobile phone 300 can be stored in the server 200.

Figure 11:
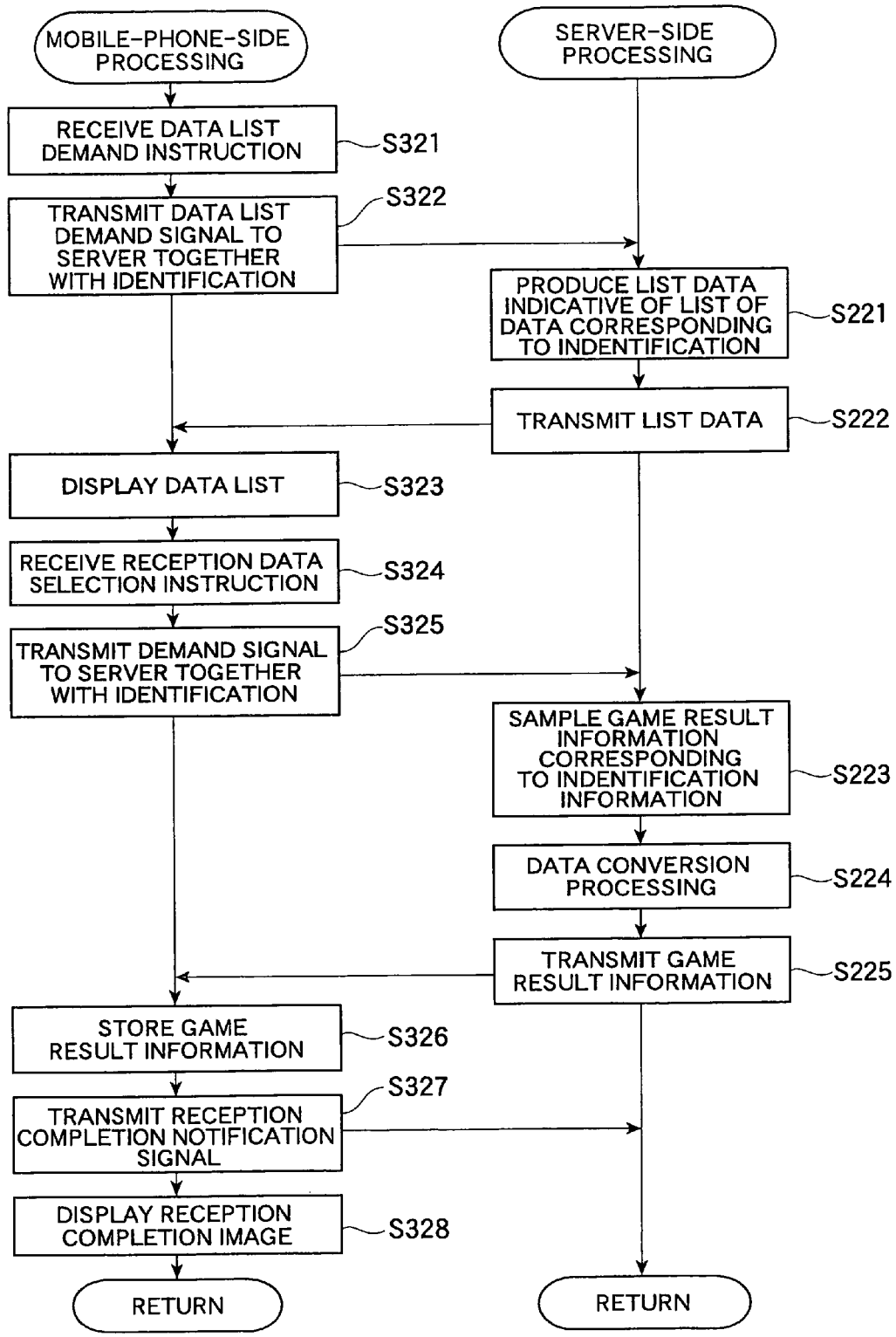
FIG. 11 is a flow chart showing a flow of processing which is executed between the mobile phone and the server when the mobile phone receives the game result information from the server.

FIG. 11 is a flowchart showing a flow of the processing which is executed in the mobile phone 300 and the server 200 when the mobile phone 300 receives the game result information from the server 200.

FIG. 12 is a view showing one example of an image displayed on the mobile phone 300 when the processing shown in FIG. 11 is executed.

First of all, the microcomputer 322 provided to the mobile phone 300 receives the inputting of an instruction which requests the server 200 to transmit list data showing a list of the game result information stored in the server 200 (step S321). At this time, when a predetermined instruction is inputted by the player using the operation part 304, the microcomputer 322 transmits a data list request signal together with the identification information on the mobile phone 300 to the server 200 (step S322).

On the other hand, upon receiving the data list request signal together with the identification information on the mobile phone 300, the CPU 201 provided to the server 200 generates the list data indicative of a list table of the game result information stored in the hard disc drive 206 corresponding to the identification information (step S221) and transmits the list data to the mobile phone 300 through the Internet through the Internet (step S222).

Figure 12A:
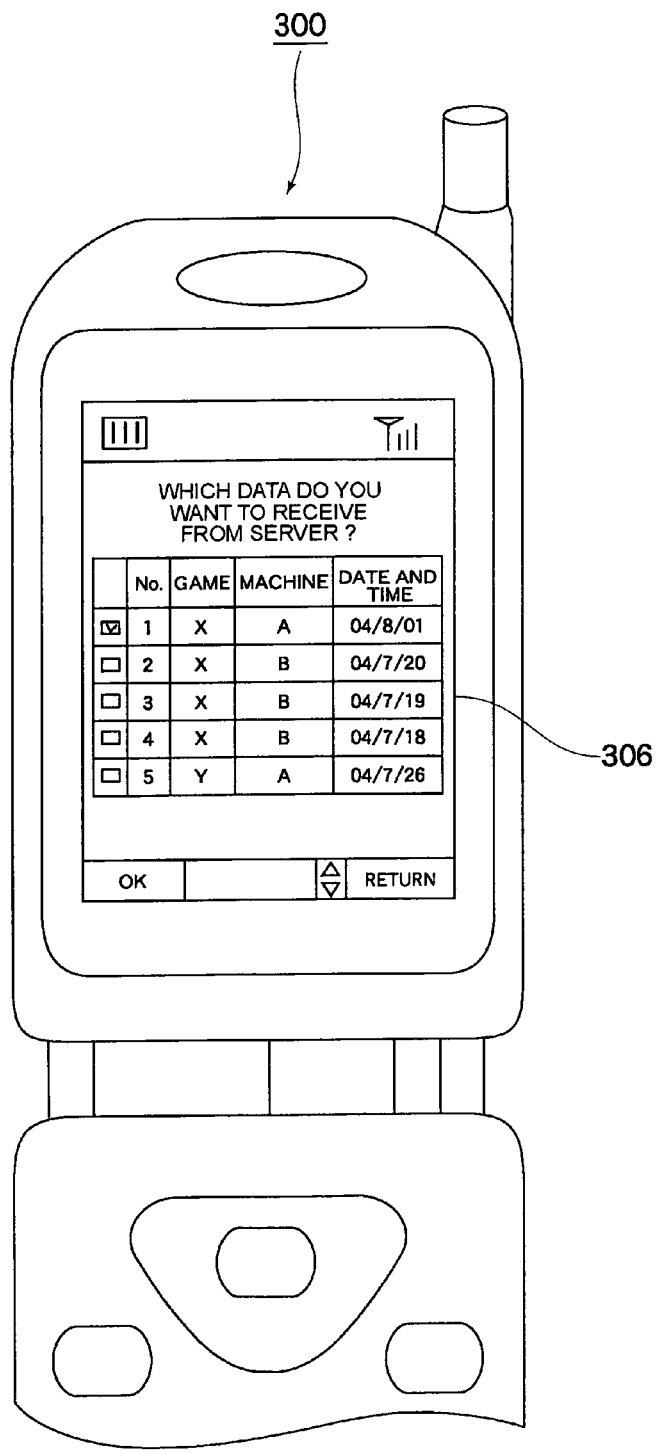
FIG. 12A to FIG. 12C are views showing one example of an image displayed on the mobile phone when the processing shown in FIG. 11 is executed.

Upon receiving the list data from the server 200, based on the list data, the mobile phone 300 reads out predetermined image data out of image data stored in the nonvolatile memory 320 and allows the liquid crystal panel 306 to display, for example, such an image as shown in FIG. 12A (step S323).

On the upper side of the liquid crystal panel 306, an image which indicates "WHICH DATA DO YOU WANT TO RECEIVE FROM THE SERVER?" and invites the selection of the game result information to transmit is displayed.

Further, in the center part of the liquid crystal panel 306, an image indicative of a list of the game result information stored in the hard disc drive 206 of the server 200 is displayed. In this list, the images indicative of five game result information are arranged and the respective images indicate the respective information on the game result information (for example, game kinds, gaming machine kinds, date and time when the game result information are generated and the like).

To be more specific, the game result information of No. 1 is game result information of a game "X" which can be recognized by a gaming machine "A" and date and time when the game result information is generated are "04/8/01".

The game result information of No. 2 is a game result information of the game "X" which can be recognized by a gaming machine "B" and date and time when the game result information is generated are "04/7/20".

The game result information of No. 3 is game result information of the game "X" which can be recognized by the gaming machine "B" and date and time when the game result information is generated are "04/7/19".

The game result information of No. 4 is game result information of the game "X" which can be recognized by a gaming machine "B" and date and time when the game result information is generated are "04/7/18".

The game result information of No. 5 is game result information of a game "Y" which can be recognized by a gaming machine "A" and date and time when the game result information is generated are "04/7/26".

Further, check boxes are displayed on the right side next to the images indicative of the respective game result information and an instruction which selects whether the game result information is received from the server 200 or not can be inputted corresponding to whether a check is inputted to the check box or not. FIG. 12A shows a state that a check is inputted in the check box displayed on the right side next to the image indicative of the game result information of No. 1.

Further, on the lower side of the liquid crystal panel 306, an image indicative of choices of "OK", "RETURN" is displayed. For example, when the image shown in FIG. 12A is displayed on the liquid crystal panel 306, the player can input an instruction which receives the game result information of No. 2 from the server 200 by selecting the choice of "OK" by operating the operation part 304.

Figure 12B:
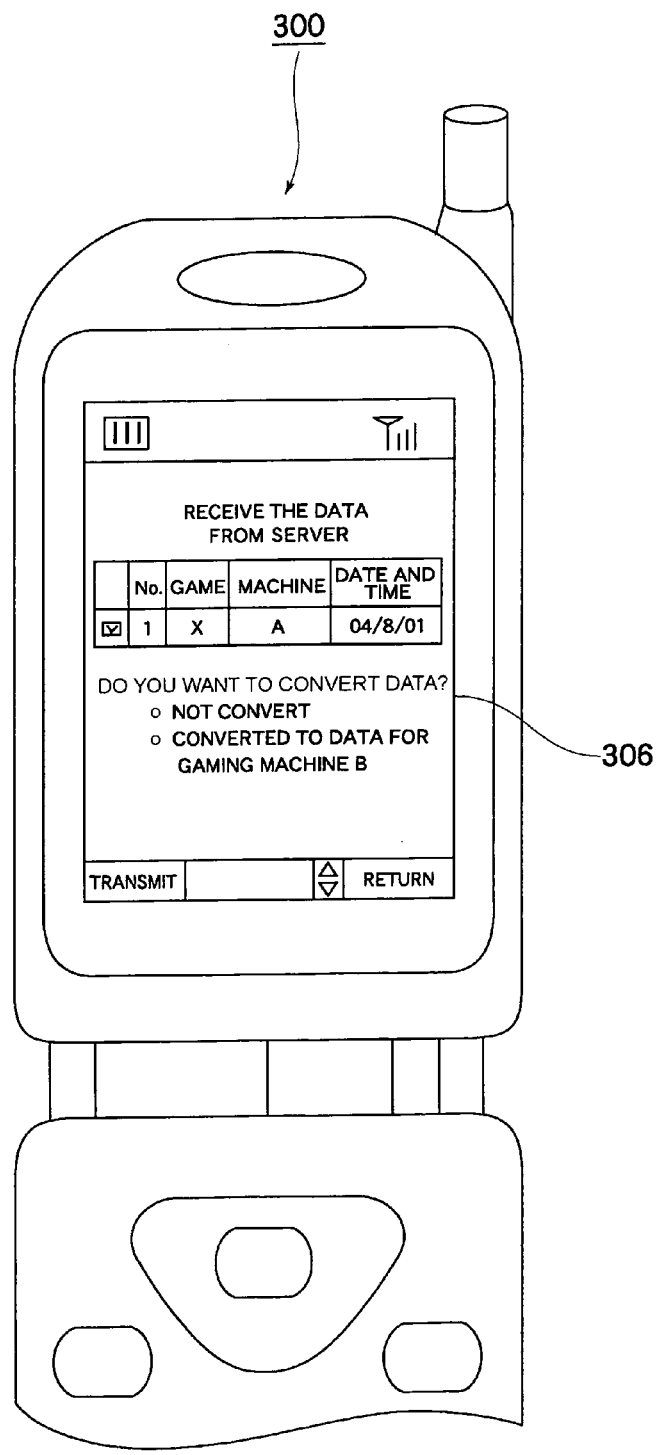

When the choice of "OK" is selected when the image shown in FIG. 12A is displayed on the liquid crystal panel 306, the microcomputer 322 of the mobile phone 300 reads out predetermined image data out of image data stored in the nonvolatile memory 320 and allows the liquid crystal panel 306 to display, for example, such an image as shown in FIG. 12B.

On the upper side of the liquid crystal panel 306, together with an image which indicates "THIS DATA IS RECEIVED FROM THE SERVER", an image indicative of the selected game result information of No. 1 is displayed.

Further, in the center part of the liquid crystal panel 306, together with an image which indicates "DO YOU WANT TO CONVERT THE DATA?", an image indicative of the choices of "NOT CONVERT", "CONVERT INTO THE DATA FOR GAMING MACHINE B" is displayed. The choice of "NOT CONVERT" is a choice for inputting an instruction which receives the game result information of No. 1 without converting (in the state which can be recognized by the gaming machine A) from the server 200. Further, the choice of "CONVERT INTO THE DATA FOR GAMING MACHINE B" is a choice for inputting an instruction which converts the game result information of No. 1 into the data which can be recognized by the gaming machine B and received from the server 200. On the right side next to the respective choices, radio buttons are displayed and by inputting a check in any one of radio buttons, the choice can be selected.

Further, on the lower side of the liquid crystal panel 306, an image indicative of choices of "TRANSMIT", "RETURN" is displayed. For example, when the image shown in FIG. 12B is displayed on the liquid crystal panel 306, the player can input an instruction which converts the game result information of No. 1 into the data for gaming machine B and receives the data from the server 200 by selecting the choice of "TRANSMIT" by operating the operation part 304.

After the processing of the step S323 is executed, the microcomputer 322 receives the inputting of an instruction which selects the game result information received from the server 200 as explained in conjunction with FIGS. 12A, B (step S324) and transmits a request signal corresponding to the instruction together with the identification information on the mobile phone 300 to the server 200 through the Internet (step S325). The request signal includes, for example, data indicative of the game result information which request the transmission to the server, data relevant to whether the conversion of the data is requested or not and, further, when the conversion of the data is requested, includes data indicative of a kind of a gaming machine which is the destination of the conversion of data.

On the other hand, upon receiving the request signal together with the identification information on the mobile phone 300 from the mobile phone 300, based on the request signal, the CPU 201 provided to the server 200 samples the game result information corresponding to the identification information on the mobile phone 300 out of the game result information stored in the hard disc drive 206 (step S223).

Next, the CPU 201 provided to the server 200 performs the data conversion processing (step S224). This processing is a processing which enables the game result information of the gaming machine "A" (business-use gaming machine main body 10) to be recognized by the gaming machine "B" (home-use gaming machine main body 40) having a different platform from the platform of the gaming machine "A" or enables the game result information of the gaming machine "B" to be recognized by the gaming machine "A".

Here, when the data conversion is not requested by the request signal, the CPU 201 advances the processing to step S225 without executing the processing of the step S224.

Next, the CPU 201 of the server 200 transmits the game result information stored in the hard disc drive 206 to the mobile phone 300 using the Internet communication part 207 through the Internet (step S225).

Upon receiving the game result information from the server 200 through the Internet, the microcomputer 322 of the mobile phone 300 allows the nonvolatile memory 320 to store the game result information (step S326).

Figure 12C:
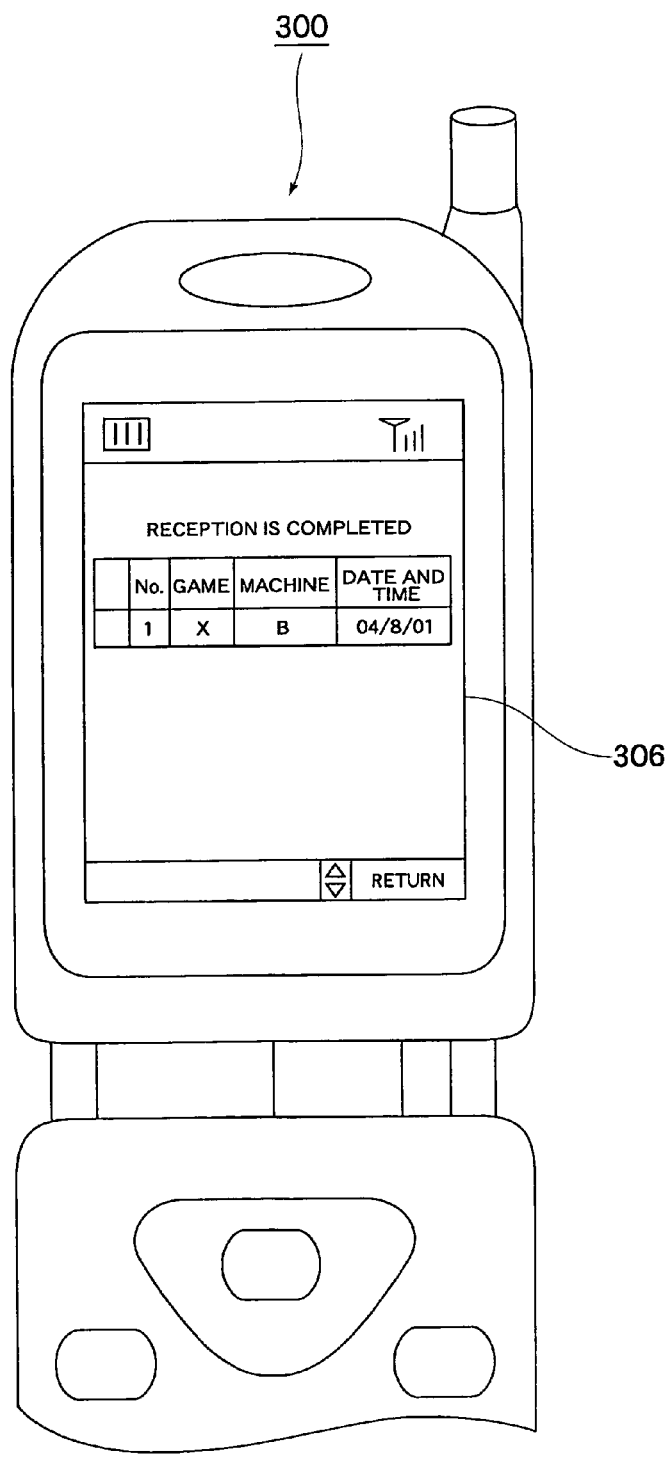

Next, the microcomputer 322 of the mobile phone 300 transmits a reception completion notifying signal which indicates that the reception of the game result information is finished to the sever 200 through the Internet (step S327) and, subsequently, reads out predetermined image data out of image data which are preliminarily stored in the nonvolatile memory 320 and allows the liquid crystal panel 306 to display an image shown in FIG. 12C, for example (step S328).

In the center part of the liquid crystal panel 306, an image indicating "RECEPTION IS COMPLETED" and an image indicative of information on the game result information such as a game kind which is indicated by the game result information, a gaming machine kind, date and time when the game result information is generated, for example, are displayed.

Figure 13:
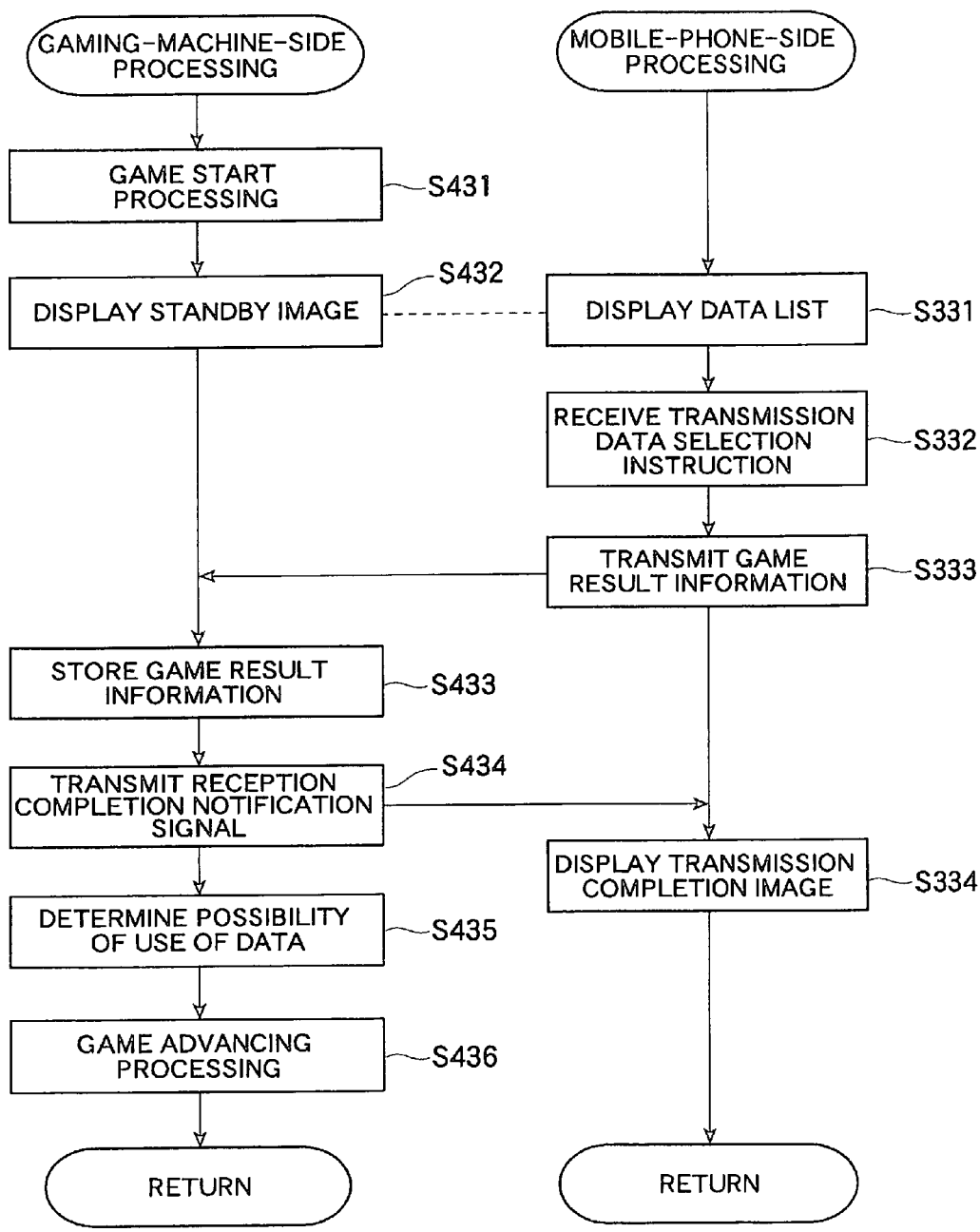
FIG. 13 is a flow chart showing a flow of processing which is executed between the home-use gaming machine and the mobile phone when the game is started.

FIG. 13 is a flowchart showing a flow of the processing which is executed in the home-use gaming machine 4 and the mobile phone 300 when the game is started.

FIG. 14 is a view showing one example of an image displayed on the mobile phone 300 when the processing shown in FIG. 13 is executed.

First of all, the home-use gaming machine 4 performs the game start processing (step S431).

In this processing, the CPU 41 provided to the home-use gaming machine main body 40 reads out a program of game software stored in the ROM 42 and performs various processing relevant to the starting of the game. That is, for example, the CPU 41 performs the initializing of predetermined region of the RAM 43, the setting of various variables used in the game, the output control of an image signal and a voice signal to the TV receiving set 49 via the output terminal 48.

Next, when predetermined instruction is inputted by the player using the controller 47, the home-use gaming machine 4 performs the display of standby image (step S432).

The standby image which is displayed in the step S432 is an image indicating that the transmission of the game result information from the mobile phone 300 is invited.

The CPU 41 of the home-use gaming machine main body 40 performs processing that predetermined image data out of image data stored in the ROM 42 is read out and the data is outputted to the TV receiving set 49 via the output terminal 48 thus allowing the TV receiving set 49 to display the standby image.

When the display of the standby image is performed in the home-use gaming machine 4, according to the contents of the standby image, the player can grasp that the transmission of the game result information from the mobile phone 300 is accepted.

Figure 14A:
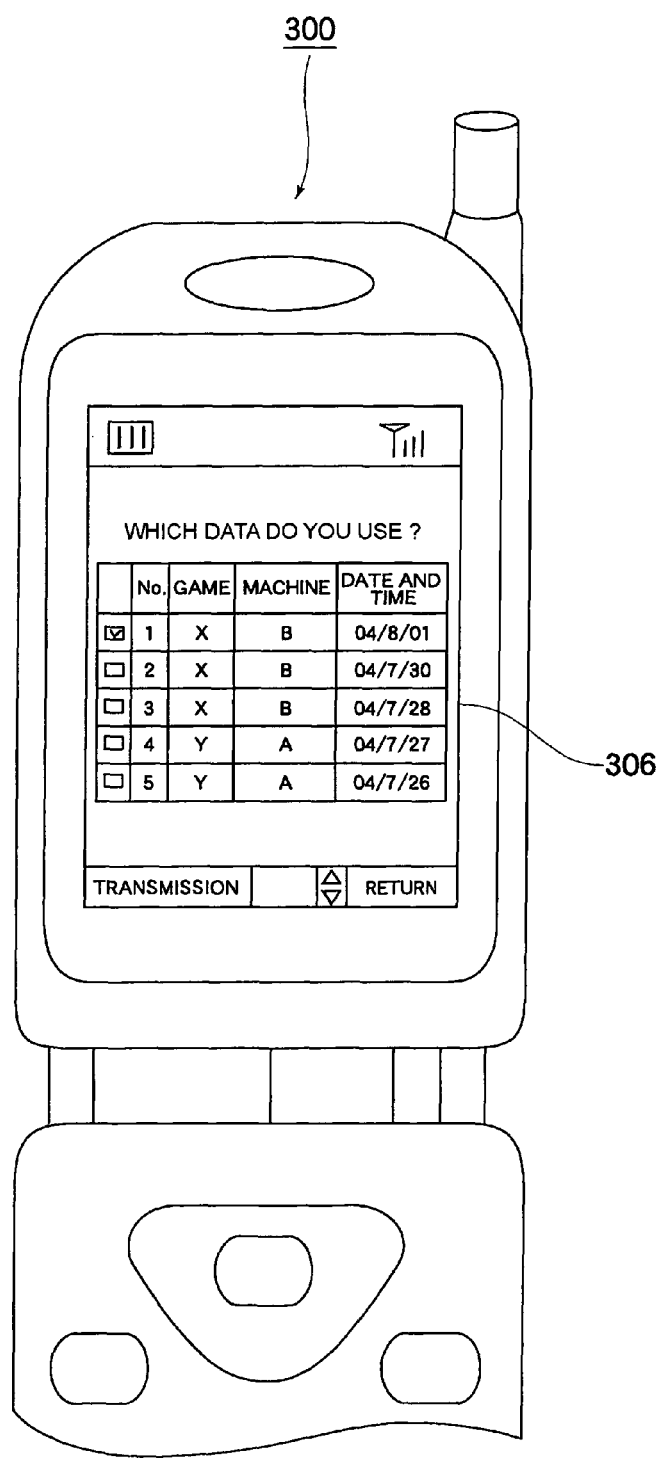
FIG. 14A and FIG. 14B are views showing one example of an image displayed on the mobile phone when the processing shown in FIG. 13 is executed.

Corresponding to the instruction inputted by the player using the operation part 304, based on the game result information stored in the nonvolatile memory 320, the microcomputer 322 provided to the mobile phone 300 reads out image data stored in the same nonvolatile memory 320 and allows the liquid crystal panel 306 to display such an image as shown in FIG. 14A, for example.

On the upper side of the liquid crystal panel 306, an image which indicates "WHICH DATA DO YOU USE?" and invites the selection of the game result information which the player uses is displayed.

Further, in the center portion of the liquid crystal panel 306, an image indicative of a list of the game result information stored in the nonvolatile memory 320 is displayed. In this list, the images indicative of five game result information are arranged and the respective images indicate the respective information on the game result information (for example, game kinds, gaming machine kinds, date and time when the game result information are generated and the like).

To be more specific, the game result information of No. 1 is game result information of a game "X" which can be recognized by a gaming machine "B" and date and time when the game result information is generated are "04/8/01".

The game result information of No. 2 is the game result information of the game "X" which can be recognized by the gaming machine "B" and date and time when the game result information is generated are "04/7/30".

The game result information of No. 3 is game result information of the game "X" which can be recognized by the gaming machine "B" and date and time when the game result information is generated are "04/7/28".

The game result information of No. 4 is game result information of a game "Y" which can be recognized by a gaming machine "A" and date and time when the game result information is generated are "04/7/27".

The game result information of No. 5 is game result information of the game "Y" which can be recognized by the gaming machine "A" and date and time when the game result information is generated are "04/7/26".

Further, check boxes are displayed on the right side next to the images indicative of the respective game result information and an instruction which selects whether the game result information is transmitted to the server 200 or not can be inputted corresponding to whether a check is inputted to the check box or not. FIG. 14A shows a state that a check is inputted in the check box displayed on the right side next to the image indicative of the game result information of No. 1.

Further, on the lower side of the liquid crystal panel 306, an image indicative of choices of "TRANSMIT", "RETURN" is displayed. For example, when the image shown in FIG. 14A is displayed on the liquid crystal panel 306, the player can input an instruction which transmits the game result information of No. 1 to the home-use gaming machine 4 by selecting the choice of "TRANSMIT" by operating the operation part 304.

Next, the microcomputer 322 of the mobile phone 300 receives the inputting of an instruction which selects the game result information to transmit (step S332) and transmits, when the instruction is inputted, out of the game result information stored in the nonvolatile memory 320, the selected game result information (step S333). In the processing of the step S333, the microcomputer 322 of the mobile phone 300 transmits the game result information to the communication unit 100 of the home-use gaming machine 4 using the infrared ray communication part 308.

On the other hand, the home-use gaming machine 4 stores the game result information received from the mobile phone 300 (step S433).

In this processing, upon receiving the game result information from the mobile phone 300 using the infrared ray communication part 110, the CPU 102 provided to the communication unit 100 of the home-use gaming machine 4 stores the game result information in the memory 109 and transmits the game result information stored in the memory 109 to the home-use gaming machine main body 40. Upon receiving the game result information from the communication unit 100, the CPU 41 of the home-use gaming machine main body 40 allows the RAM 43 to store the game result information.

Next, the home-use gaming machine 4 transmits the reception completion notifying signal to the mobile phone 300 (step S434).

In this processing, the CPU 41 of the home-use gaming machine main body 40 transmits a signal which indicates that the reception of the game result information is completed to the communication unit 100. Upon receiving the above-mentioned signal from the home-use gaming machine main body 40, the CPU 102 provided to the communication unit 100 transmits the reception completion notifying signal to the mobile phone 300 using the infrared ray communication part 110.

Figure 14B:
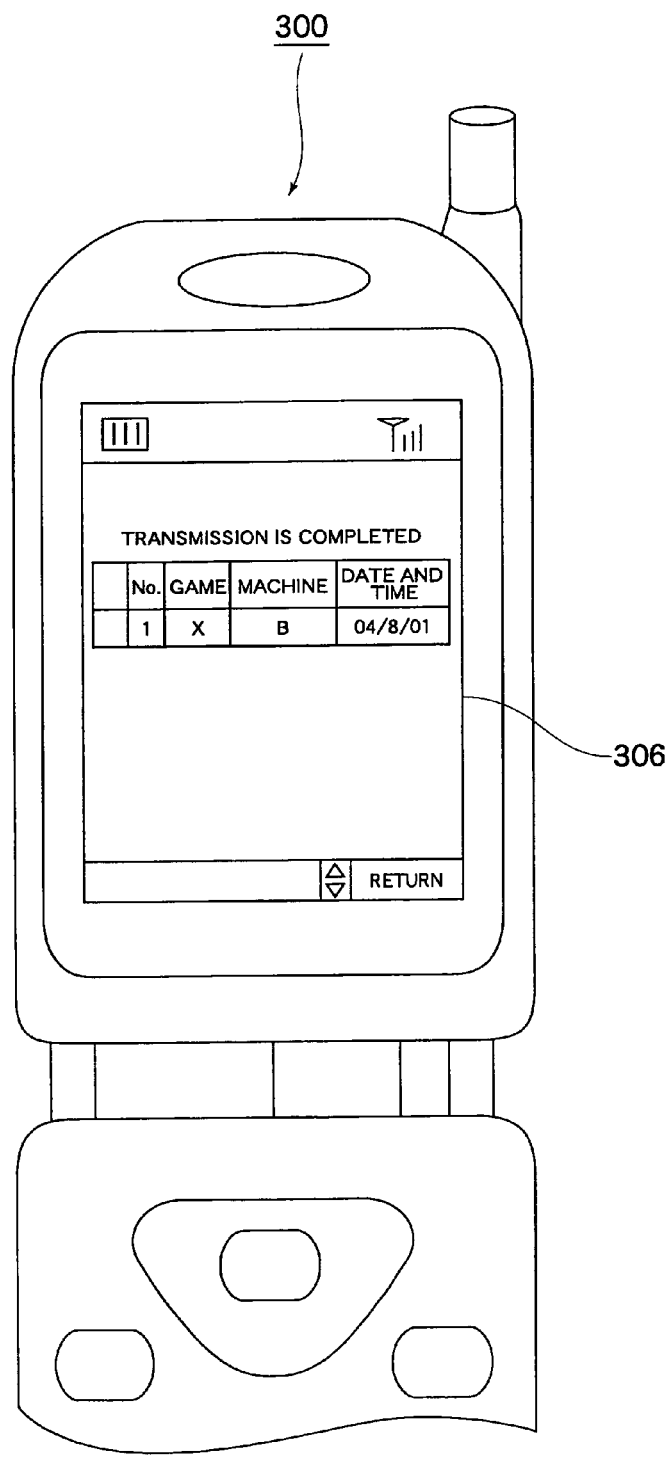

Upon receiving the reception completion notifying signal from the home-use gaming machine 4 using the infrared ray communication part 308, the microcomputer 322 provided to the mobile phone 300 reads out predetermined image data out of image data stored in the nonvolatile memory 320 and allows the liquid crystal panel 306 to display, for example, such an image as shown in FIG. 14B (step S334).

In the center part of the liquid crystal panel 306, an image indicating "TRANSMISSION IS COMPLETED" and an image indicative of information on the game result information such as a game kind which is indicated by the game result information, a gaming machine kind, date and time when the game result information is generated, for example, are displayed.

On the other hand, the home-use gaming machine 4 determines, after the processing of the step S434, whether the game result information received from the mobile phone 300 can be used in the game or not (step S435).

In this processing, the CPU 41 of the home-use gaming machine main body 40 determines whether the game result information stored in the RAM 43 can be used in the game, that is, whether the game result information can be recognized by the gaming machine "B" or not.

When the CPU 41 of the home-use gaming machine main body 40 determines that the game result information stored in the RAM 43 can be used in the game, the CPU 41 executes the game advancing processing using the game result information (step S436).

In this manner, according to the gaming system of the present invention, since the game result information can be stored in the nonvolatile memory 320 of the mobile phone 300 (see FIG. 7, FIG. 8), it is possible to impart a function of a memory card to the mobile phone 300.

Further, by making use of the communication function provided to the mobile phone 300, the game result information can be transmitted to the server 200 together with the identification information on the mobile phone 300 and hence, the game result information can be stored in the server 200 (see FIG. 9, FIG. 10). Accordingly, the function of the mobile phone 300 as the memory card is not limited by the data storing capacity of the nonvolatile memory 320 of the mobile phone 300.

Further, the game may be advanced in the following manner based on the game result information. That is, the game result information is read out from the server 200 to the mobile phone 300 and the game result information is transmitted from the mobile phone 300 to the gaming machine (see FIG. 11 to FIG. 14). Accordingly, it is possible to resume the game which is paused or new game is started based on the game result information of the previous game.

Further, it is possible to convert the game result information relevant to the game performed in the gaming machine "A" into the game result information which can be recognized by the gaming machine "B" or convert the game result information relevant to the game performed in the gaming machine "B" into the game result information which can be recognized by the gaming machine "A" (see FIG. 11, FIG. 12).

The embodiments of the present invention have been explained hereinabove. However, only specific examples are explained and the present invention is not limited to the examples and specific constitution of the respective unit or the like can be arbitrary modified. Further, the advantageous effects described in the embodiments of the present invention are only the most favorable effect generated from the present invention which are listed and the advantageous effects according to the present invention are not limited to the effects described in the embodiments of the present invention.

To recapitulate the present invention having the above-mentioned constitution, it is possible to transmit the game result information relevant to the game result to the portable terminal such as a mobile phone which has been recently popularly used and anyone in the younger generation possesses from the gaming machine. Accordingly, for example, it is possible to allow the storing unit provided to the portable terminal to store the game result information and to impart a function of a memory card to the portable terminal. Further, by transmitting the game result information together with the identification information of the portable terminal (for example, telephone number of the mobile phone or the like) to the server by making use of the communication function that the portable terminal possesses, it is possible to store the game result information in the server and hence, there is no possibility that the function of the server as the memory card is not limited attributed to the data storing capacitance of the portable terminal. Accordingly, for example, it is no more necessary to newly purchase a memory card at the time of purchasing a gaming machine having a different platform whereby the game manufacturer can increase the number of sales of the gaming machine.

Further, the game manufacturer can obtain various information such as the player's taste of the game, the manner of advancing the game, the advancing speed of the game and the like, for example, from the identification information and the game result information stored in the server. Accordingly, the game manufacturer can perform the development which corresponds to the taste of the player whereby the game manufacturer can more reliably collect the cost for developing the game. Further, the gaming system can distribute various information relevant to the game such as the information to win the game, image data (so-called standby image or the like), music data (so called receiving melody) and the like, for example, to the portable terminal based on the game result information stored in the server whereby the gaming system can provide services which attract the player to the game.

Further, the gaming machine includes the unit which performs the control to proceed the game based on the game result information when the unit receives the game result information from the portable terminal, and the server includes the unit which, when the unit receives the request signal requesting the transmission of the game result information from the portable terminal, samples the game result information corresponding to the identification information which the portable terminal which constitutes the transmission source of the request signal possesses from the storing unit provided to the server, and transmits the game result information to the portable terminal which constitutes the transmission source of the request signal.

Due to such a constitution, the game result information can be read out from the server and can be transmitted to the portable terminal and, at the same time, the game result information can be transmitted to the gaming machine from the portable terminal and hence, it is possible to proceed the game based on the game result information whereby the player can resume the paused game or start the new game based on the game result information of the previous work.

Further, the server includes the unit which converts the game result information on a game result in one gaming machine into game result information which another gaming machine having a platform different from a platform of one gaming machine can recognize.

Due to such a constitution, the game which is paused during the play using one gaming machine can be resumed using another gaming machine which has the different platform. Further, it is possible to start the new game using another gaming machine based on the game result information relevant to the game of the preceding work which is performed using one gaming machine. Accordingly, even if the game software of the next work does not correspond to the gaming machine to which the game software of the preceding work corresponds, by converting the game result information of the preceding work to the game result information which the gaming machine to which the game software of the next work corresponds can recognize, it is possible to perform the game of the next work based on the game result information of the previous work. As a result, the game manufacturer determines which gaming machine the game software is to correspond depending on the number of users of the gaming machine and the game manufacturer can take measure such as the postponement of the development of the software corresponding to the gaming machine with small number of users whereby the increase of the development cost of the game software can be suppressed.

In the game server which is communicable with the portable terminal which is mutually communicable with the gaming machine, the game server includes the unit which receives game result information relevant to the game result when the game is paused or finished which is transmitted to the personal terminal from the gaming machine together with the identification information which the portable terminal possesses from the portable terminal, and the unit which stores the received game result information corresponding to identification information of the portable terminal.

Due to such a constitution, since it is possible to allow the server to receive and store the game result information together with the identification information (for example, the telephone number of the mobile phone or the like) of the portable terminal, it is unnecessary to increase the data storing capacitance of the portable terminal.

The game server further includes the unit which, when the game server receives the request signal requesting the transmission of the game result information from the portable terminal, samples the game result information which corresponds to the identification information which the portable terminal which constitutes the transmission source of the request signal possesses from the storing unit, and transmits the game result information to the portable terminal which constitutes the transmission source of the request signal.

Due to such a constitution, the game server can read out the game result information from the storing unit and transmits the game result information to the portable terminal, while the portable terminal which receives the game result transmits the game result information to the gaming machine and hence, it is possible to proceed the game based on the game result information whereby it is possible to resume the paused game or to start the new game based on the game result information of the previous work.

The gaming server includes the unit which converts the game result information relevant to the game result of one gaming machine into the game result information which is recognizable by other gaming machine having the platform different from the platform of one gaming machine.

Due to such a constitution, the game which is paused during the play using one gaming machine can be resumed using another gaming machine which has the different platform. Further, it is possible to start the new game using another gaming machine based on the game result information relevant to the game of the preceding work which is performed using one gaming machine. Accordingly, even if the game software of the next work does not correspond to the gaming machine to which the game software of the preceding work corresponds, by converting the game result information of the preceding work to the game result information which the gaming machine to which the game software of the next work corresponds can recognize, it is possible to perform the game of the next work based on the game result information of the previous work. As a result, the game manufacturer determines which gaming machine the game software is to correspond depending on the number of users of the gaming machine and the game manufacturer can take measure such as the postponement of the development of the software corresponding to the gaming machine with small number of users whereby the increase of the development cost of the game software can be suppressed.

The gaming machine includes the unit which transmits game result information relevant to a game result when the game is paused or finished to the portable terminal, and the unit which performs the control to proceed the game based on the game result information when the unit receives the game result information from the portable terminal.

Due to such a constitution, even when the game is paused, it is possible to resume the paused game using the portable terminal.

What is claimed is:

1. A network game system including:
   a plurality of game terminals, each being provided with an identification number; and
   a network game server connected to each of the game terminals via a network and for determining sources of data transmitted from the game terminals based on the identification number to manage information inputted in the plurality of game terminals,
   wherein the network game server comprising:
      a database in which is stored personal utilization history information, managed in relation to user identification information that specifies a user in a point of sale (POS) terminal that is different from the game terminals, concerning history of utilization of shops or network shopping sites by the user, and a plurality of event information items, the event information items consisting of advertisements for the shops or network shopping sites corresponding to the personal utilization history;
      a first receiver for receiving the user identification information concerning a player and transmitted from the game terminals;
      a retrieving unit for retrieving from the database the personal utilization history information related to the user identification information received by the first receiver;
      an extracting unit for extracting, according to the personal utilization history information retrieved by the retrieving unit, an event information item associated with the personal utilization history, from the database; and
      a first transmitter for transmitting the event information item extracted by the extracting unit and for generating a game screen executed in each of the game terminals that includes the event information item;
   each of the game terminals comprising:
      an image display for displaying the game screen;
      an input unit for inputting the user identification information of the player;
      a second transmitter for transmitting the user identification information of the player to the network game server;
      a second receiver for receiving the event information item conforming to a current scene of a game, which is selectively extracted based on the personal utilization history information related to the user identification information, transmitted from the network game server;
      a first storage unit for storing the event information item received by the second receiver; and
      a drawing unit for generating the game screen displayed by the image display that includes the event information item stored in the first storage unit to display the event information item into the game screen in association with the scene of the game.

2. The network game system according to claim 1, wherein
   each of the game terminals further comprises a control unit for executing a game program;
   the control unit causes the second transmitter to transmit type discriminating data concerning type of game selected to the network game server; and
   the network game server further comprises an editing unit for editing, according to the type discriminating data transmitted from the game terminal, the event information item extracted by the extracting unit.

3. The network game system according to claim 2, wherein
   the event information items are stored in the database in association with the type discriminating data; and
   the editing unit extracts the event information item stored in the database in association with the type discriminating data transmitted by the game terminal.

4. The network game system according to claim 1, wherein
   each of the game terminals further comprises a control unit for executing a game program;
   the event information items are stored in the database in association with scene information for specifying a scene concerning a game image displayed by the game terminal, according to the game program;
   the extracting unit extracts the event information item and the scene information associated with the event information item;
   the first transmitter transmits to the game terminal the event information item and scene information extracted by the extracting unit;
   the second receiver receives the event information item and the scene information transmitted from the network game server;
   the storage unit stores, in association with the scene information received by the second receiver, the event information item received together with the scene information;
   the control unit outputs game screen information, for specifying a game screen to be displayed, to the image display according to the game program; and
   the drawing unit selects the event information item stored in the storage unit according to the scene information concerning the game image specified by the game screen information output by the control unit, and generates the game screen that includes the event information item.

5. The network game system according to claim 1, further comprising:
   a plurality of point of sale (POS) terminals placed in respective shops; and
   a POS server connected to the POS terminals, wherein
   each of the POS and game terminals comprises a reading unit for reading personal identification data from an ID card having stored therein personal identification data of a user;
   the POS server comprises
      a second storage unit for cumulatively storing, in association with the personal identification information read from an ID card of the user, species or genuses of services used or products purchased in the shops or temporal/geographic information regarding services used or products purchased as first history information, and a third transmitter for transmitting the first history information stored in the second storage unit to the network game server;

the network game server further comprises a third receiver for requesting the POS server to send the first history information corresponding to the personal identification data read by the reading unit and receiving the first history information, a third storage unit for storing the first history information received by the third receiver, and a fourth transmitter for transmitting the first history information stored in the third storage unit or information related to the first history information to the game terminal;

each of the game terminals further comprises a first display control unit for displaying the first history information or information related to the first history information on the game screen of a game terminal;

the third storage unit cumulatively stores, in association with personal identification data read from an ID card of a player playing a game with a game terminal, a play history of the player as second history information;

the network game server further comprises a fifth transmitter for transmitting the second history information to the POS server;

the POS server further comprises a fourth receiver for requesting the network game server to send the second history information and for receiving the second history information, the second storage unit stores the second history information received by the fourth receiver, and a sixth transmitter for transmitting the second history information stored in the second storage unit or information related to the second history information to a POS terminal; and each of the POS terminals further comprises a POS screen and a second display control unit for displaying the second history information or information related to the second history information that is transmitted on the POS screen of a POS terminal.

6. A network server connected to a shop network server of a shop or a network shopping site of a user in a point of sale (POS) terminal different from a plurality of game terminals and for controlling a display of event information including advertisement information, the network server comprising:

a first database which stores personal utilization history information managed by associating a utilization history of the user stored in a second database of the shop network server with user identification information, and a plurality of event information items in the shop or network shopping site corresponding to the personal utilization history information; and a control unit for using the first database and for, based on the user identification information of the first database, controlling screens of the game terminals that are displayed in as state where the game terminals are connected to the network server so that the event information items related to the user identification information associated with each game terminal are different for each game scene, wherein the first database stores scene information for specifying a game scene concerning a game image displayed by each game terminal in association with the event information item, wherein the control unit comprises:

a receiver for receiving the user identification information of users transmitted from the game terminals;

a retrieving unit for retrieving from the first database the personal utilization history information related to the user identification information received by the receiver;

an extracting unit for extracting the personal utilization history information retrieved by the retrieving unit and for extracting an event information item associated with the personal utilization history information from the first database so that the extracted event information item is varied in accordance with each personal utilization history; and a transmitter for extracting, based on scene information for each current game scene, an event information item associated with the scene information from the first database so that a plurality of kinds of event information items are extracted to be different for each personal utilization history, and for transmitting to the game terminals signals to be displayed in the screens of the game terminals.

* * * * *